US011159707B2

(12) United States Patent
Endo et al.

(10) Patent No.: US 11,159,707 B2
(45) Date of Patent: Oct. 26, 2021

(54) MAIN BODY OF INTERCHANGEABLE-LENS IMAGE PICKUP APPARATUS, MOUNT APPARATUS FOR SAME, AND FLANGE BACK ADJUSTMENT MEMBER

(71) Applicant: CANON KABUSHIKI KAISHA, Tokyo (JP)

(72) Inventors: Yosaku Endo, Yokohama (JP); Hideki Toichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/986,368

(22) Filed: Aug. 6, 2020

(65) Prior Publication Data

US 2021/0058538 A1 Feb. 25, 2021

(30) Foreign Application Priority Data

Aug. 20, 2019 (JP) .............................. JP2019-150317

(51) Int. Cl.
 *H04N 5/225* (2006.01)
(52) U.S. Cl.
 CPC .................................. *H04N 5/2254* (2013.01)
(58) Field of Classification Search
 CPC .. H04N 5/2254; H04N 5/2252; H04N 5/2253; H04N 5/2257; G03B 17/14
 See application file for complete search history.

(56) References Cited

U.S. PATENT DOCUMENTS

| 2004/0042090 | A1* | 3/2004 | Nomura | G02B 7/026 |
| | | | | 359/819 |
| 2004/0051981 | A1* | 3/2004 | Nomura | G02B 15/143 |
| | | | | 359/822 |
| 2018/0107098 | A1* | 4/2018 | Ifuku | H04N 5/2254 |
| 2018/0203213 | A1* | 7/2018 | Ueki | G03B 17/14 |

FOREIGN PATENT DOCUMENTS

JP 2009147667 A 7/2009

* cited by examiner

*Primary Examiner* — Lin Ye
*Assistant Examiner* — John H Morehead, III
(74) *Attorney, Agent, or Firm* — Rossi, Kimms & McDowell LLP

(57) ABSTRACT

A main body of an image pickup apparatus which enables a user to easily interchange mount apparatuses, and at this time, adjust and finely adjust the flange back. At least one flange back adjustment member is removably held between the mount apparatus and an image pickup device holding member of the main body. In a state in which the mount apparatus is attached to the main body with at least one flange back adjustment member, on a projection surface in a case of viewing the main body from the front side in a direction of an optical axis, fixing portions that fix the mount apparatus to the main body, the at least one flange back adjustment member, and a connector of the main body or the mount apparatus are overlapped with an outside shape of the mount apparatus.

22 Claims, 16 Drawing Sheets

FIG. 15

| | ADJUSTMENT SHIMS ON LEFT SIDE | ADJUSTMENT SHIMS ON RIGHT SIDE | ADJUSTMENT SHIMS ON UPPER SIDE | TOTAL THICKNESS ON UPPER LEFT | TOTAL THICKNESS ON UPPER RIGHT | TOTAL THICKNESS ON LOWER RIGHT | TOTAL THICKNESS ON LOWER LEFT |
|---|---|---|---|---|---|---|---|
| FIG.14A | TWO 0.1-MM -THICK SHIMS | ONE 0.1-MM -THICK SHIM | NONE | 0.2 | 0.1 | 0.1 | 0.2 |
| FIG.14B | TWO 0.1-MM -THICK SHIMS | ONE 0.1-MM -THICK SHIM | ONE 0.1-MM -THICK SHIM | 0.3 | 0.2 | 0.1 | 0.2 |
| FIG.14C | TWO 0.1-MM -THICK SHIMS | ONE 0.1-MM -THICK SHIM | ONE 0.1-MM-THICK SEPARATE SHIM (ON UPPER RIGHT) | 0.2 | 0.2 | 0.1 | 0.2 |

— # MAIN BODY OF INTERCHANGEABLE-LENS IMAGE PICKUP APPARATUS, MOUNT APPARATUS FOR SAME, AND FLANGE BACK ADJUSTMENT MEMBER

BACKGROUND OF THE INVENTION

Field of the Invention

The present invention relates to main bodies of interchangeable-lens image pickup apparatuses, mount apparatuses for the same, and flange back adjustment members, and in particular, main bodies of image pickup apparatuses on which mount apparatuses are interchangeable.

Description of the Related Art

Interchangeable-lens image pickup apparatuses to which different type of lenses with different flange backs can be attached is lately known. Such image pickup apparatuses are configured to interchangeably use various type of lens mounts suited for different type of lenses so that the different type of lenses can be attached to the image pickup apparatuses.

On the other hand, with increase in the pixel resolution and size of image pickup devices used for image pickup apparatuses, high accuracy is required for the flange back in terms of distance and tilt. For this reason, it is preferred that the flange back is adjustable when a user has changed a mount apparatus to another on an image pickup apparatus. As disclosed in, for example, Japanese Laid-Open Patent Publication (Kokai) No. 2009-147667, an image pickup apparatus with a flange back adjustment shim disposed between a unit frame for an image pickup device and a lens mount has been developed as an image pickup apparatus capable of adjusting the flange back. In this image pickup apparatus, the flange back is adjusted in terms of distance by appropriately changing flange back adjustment shims.

However, according to Japanese Laid-Open Patent Publication (Kokai) No. 2009-147667, the image pickup apparatus is configured such that the flange back is adjusted using the flange back adjustment shim inside a main body of the image pickup apparatus, and hence it is difficult for a user to adjust the flange back. Namely, adjusting the flange back needs processes to remove a knob ring, remove a decorative cover, remove the lens mount, and then interchange the flange back adjustment shims, and in addition, a process to remove several tens of screws, which are complicated. Moreover, the flange back adjustment shim has a ring shape, and hence it is only possible to adjust the flange back in terms of distance, and fine flange back adjustments such as a tilt adjustment are impossible.

SUMMARY OF THE INVENTION

The present invention provides main bodies of image pickup apparatuses which enable a user to easily interchange lens mount apparatuses, and at this time, adjust and finely adjust the flange back, the lens mount apparatuses for the main bodies, and flange back adjustment members.

Accordingly, a first aspect of the present invention provides a main body of an image pickup apparatus to and from which a mount apparatus is capable of being attached and detached. The main body comprises: a casing cover disposed on a front side of the main body to which the mount apparatus is attachable; a connector configured to be electrically connected to the mount apparatus; and fixing portions. The fixed portions are configured to fix the mount apparatus to the main body and bold removably at least one flange back adjustment member between the mount apparatus and the fixing portions. The fixing portions include a first fixing portion, a second fixing portion, and a third fixing portion that are different from one another and configured to hold a flange back adjustment member with the first fixing portion and the second fixing portion while holding another flange back adjustment member with the second fixing portion and the third fixing portion. In a state in which the mount apparatus is attached to the main body with at least one flange back adjustment member held between the mount apparatus and the fixing portions, on a projection surface in a case of viewing the main body from the front side in a direction of an optical axis, the first to third fixing portions, the at least one flange back adjustment member, and the connector are overlapped with an outside shape of the mount apparatus. The main body may further comprise an image pickup device holding member to which the mount apparatus is fixed. The mount apparatus may be interchangeable with another according to an interchangeable lens to be attached to the mount apparatus, and the mount apparatuses capable of being fixed to the image pickup device holding member according to the interchangeable lenses may include respective different electric terminals. The image pickup device holding member may include a terminal for electrically connecting to each of the different electric terminals of the mount apparatuses. The image pickup device holding member may include bearing faces that are disposed in proximity to respective positioning portions that define a position at which the mount apparatus is fixed to the image pickup device holding member, and each of the bearing faces may hold a thickness adjustment portion of the flange back adjustment member put between the bearing face and a fixing portion of the mount apparatus.

Accordingly, a second aspect of the present invention provides a mount apparatus capable of being attached to and detached from a main body of an image pickup apparatus. The mount apparatus comprises: a connector configured to be electrically connected to the main body; and fixing portions configured to be fixed to the main body and hold removably at least one flange back adjustment member between the main body and the fixing portions. The fixing portions include a first fixing portion, a second fixing portion, and a third fixing portion that are different from one another and configured to hold a flange back adjustment member with the first fixing portion and the second fixing portion while holding another flange back adjustment member with the second fixing portion and the third fixing portion. In a state in which the mount apparatus is attached to the main body with at least one flange back adjustment member held between the main body and the fixing portions, on a projection surface in a case of viewing the main body from a front side thereof to which the mount apparatus is attachable in a direction of an optical axis, the first to third fixing portions, the at least one flange back adjustment member, and the connector are overlapped with an outside shape of the mount apparatus.

Accordingly, a third aspect of the present invention provides a flange back adjustment member for an image pickup apparatus including a main body, an image pickup device holding member that holds an image pickup device in the main body, and the mount apparatus for attaching an interchangeable lens to the main body, for being held between the mount apparatus and the image pickup device holding member. The flange back adjustment member comprises: an arc-shaped member made of a thin sheet. The arc-shaped member includes thickness adjustment portions provided at both ends of the arc-shaped member, positioning portions provided in proximity to the thickness adjustment portions, respectively, and a cut portion that is formed in a central part of the arc-shaped member a width of which is smaller than a width of an area of the arc-shaped member other than the central part.

The present invention allows a user to easily interchange mount apparatuses on a main body of the image pickup apparatus to and from which a mount apparatus is capable of being attached and detached, and further allow the user adjustment and finely adjustment of the flange back together with the interchange.

Further features of the present invention will become apparent from the following description of exemplary embodiments with reference to the attached drawings.

BRIEF DESCRIPTION OF THE DRAWINGS

FIG. 15 is a table of total thicknesses of thickness adjustment portions for various combinations of the adjustment shims illustrated in FIGS. 14A to 14C.

DESCRIPTION OF THE EMBODIMENTS

Embodiments of the present invention will now be described in detail with reference to the drawings.

First Embodiment

Figure 1A:
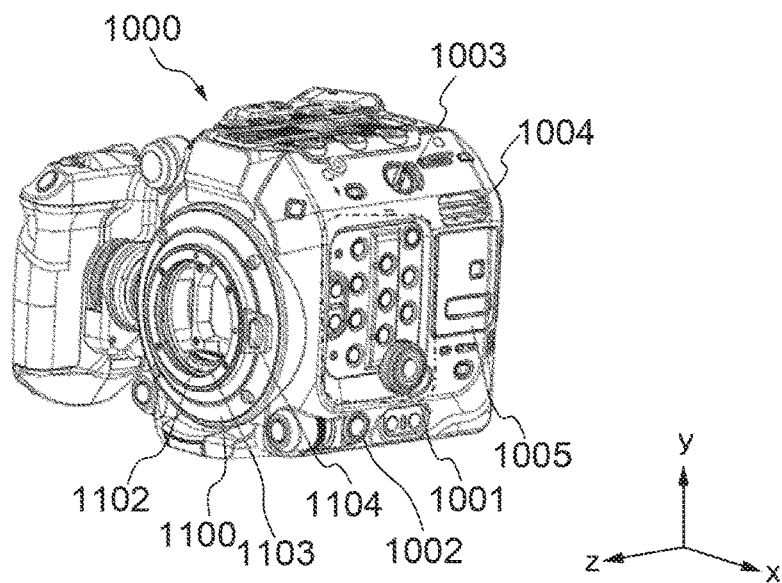
FIGS. 1A to 1C are perspective views of an image pickup apparatus according to a first embodiment.
Figure 1B:
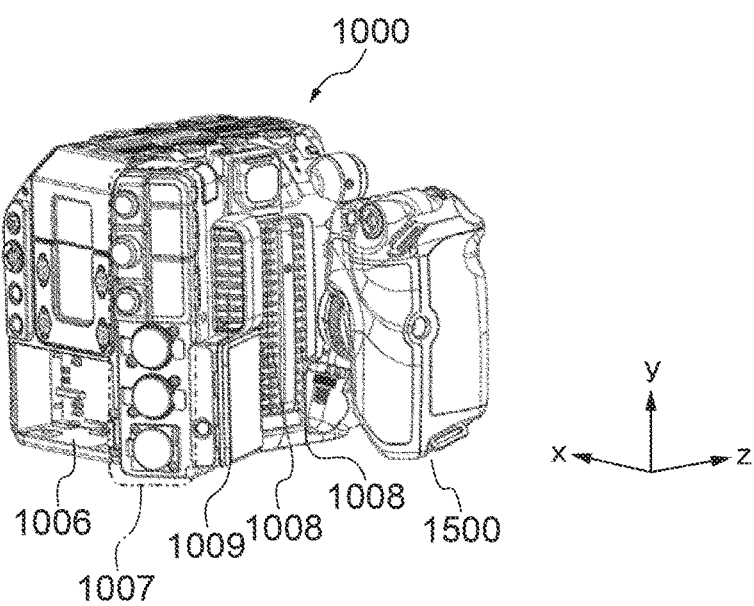
Figure 1C:
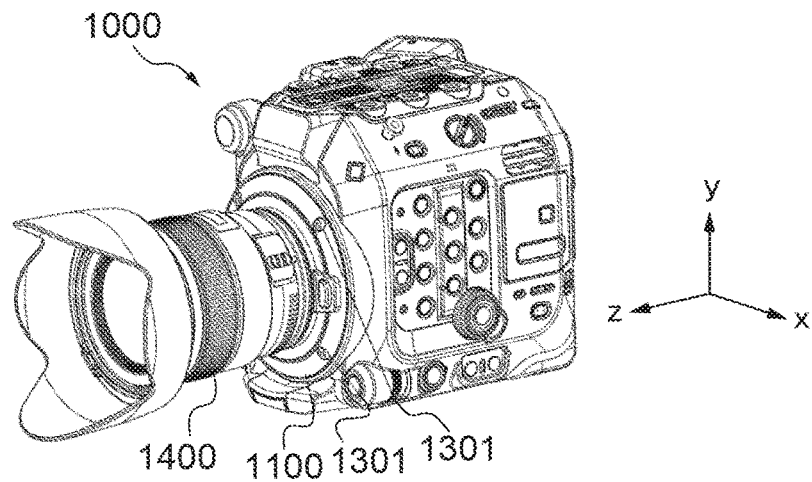

FIGS. 1A to 1C are perspective views of an image pickup apparatus according to a first embodiment. FIG. 1A is a front perspective view of the image pickup apparatus, FIG. 1B is a rear perspective view of the image pickup apparatus, and FIG. 1C is a front perspective view illustrating a state in which a first interchangeable lens is attached to the image pickup apparatus.

Referring to FIGS. 1A to 1C, the image pickup apparatus is an interchangeable-lens image pickup apparatus and will hereafter be referred to merely as "the image pickup apparatus". For the convenience of explanation, a coordinate system is defined as illustrated in FIGS. 1A to 1C. Namely, it is assumed that the Z axis is the front-back direction (a direction toward a front lens is the +Z direction), the Y axis is the vertical direction (a direction toward an upper side is the +Y direction), and the X axis is the horizontal direction (a direction toward a right side as viewed from the front is a +X direction).

As illustrated in FIGS. 1A to 1C, a first mount unit 1100 which is a lens mount apparatus is removably fixed to a front side of an image pickup apparatus main body 1000. The first mount unit 1100 includes a first mount portion 1102, a first terminal unit 1103 which carries out communications with a first interchangeable lens 1400, and a lens-release button 1104 for removing the first interchangeable lens 1400. The first terminal unit 1103 functions as an electric terminal.

On a right side of the image pickup apparatus main body 1000 as seen from the front, an operating button group 1001 for causing the image pickup apparatus main body 1000 to perform predetermined operations in response to user's operations. A REC button 1002 and a power switch 1003 are also disposed on the right side. An intake port 1004 for taking in low-temperature air through a fan (not shown) disposed inside the image pickup apparatus main body 1000 is also provided on the right side. A recording medium housing lid 1005 which covers a housing chamber in which a recording medium (not shown) is housed is provided on a rear part of the right side and in the vicinity of the intake port 1004.

As illustrated in FIG. 1B, a battery housing unit 1006 which houses a battery and an input-output terminal group 1007 including an external connecting terminal, a power supply terminal, and so forth are disposed on a rear side of the image pickup apparatus main body 1000.

On a left side of the image pickup apparatus main body 1000 as seen from the front, an intake port 1008 for taking in low-temperature air through the fan described above, an exhaust port 1009 for exhausting high-temperature air to the outside, and a grip 1500 that is gripped by a user to hold the image pickup apparatus.

A description will now be given of a construction around an image pickup device of the image pickup apparatus main body 1000.

Figure 2A:
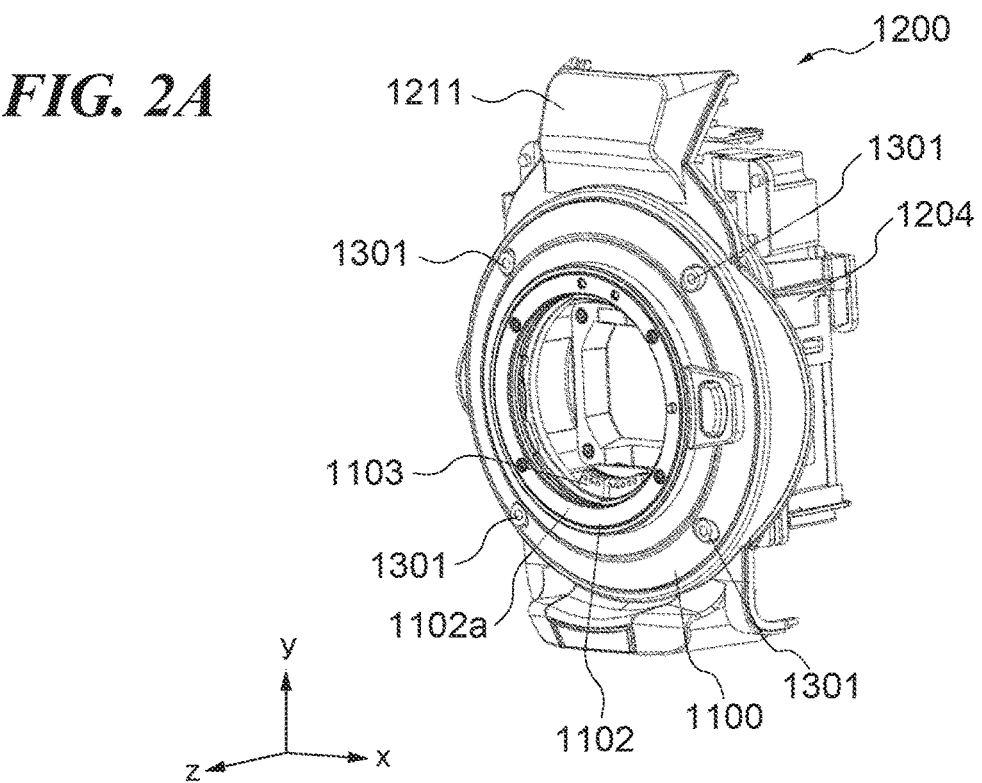
FIGS. 2A and 2B are perspective views illustrating a front casing cover unit of the image pickup apparatus in FIGS. 1A to 1C.
Figure 2B:
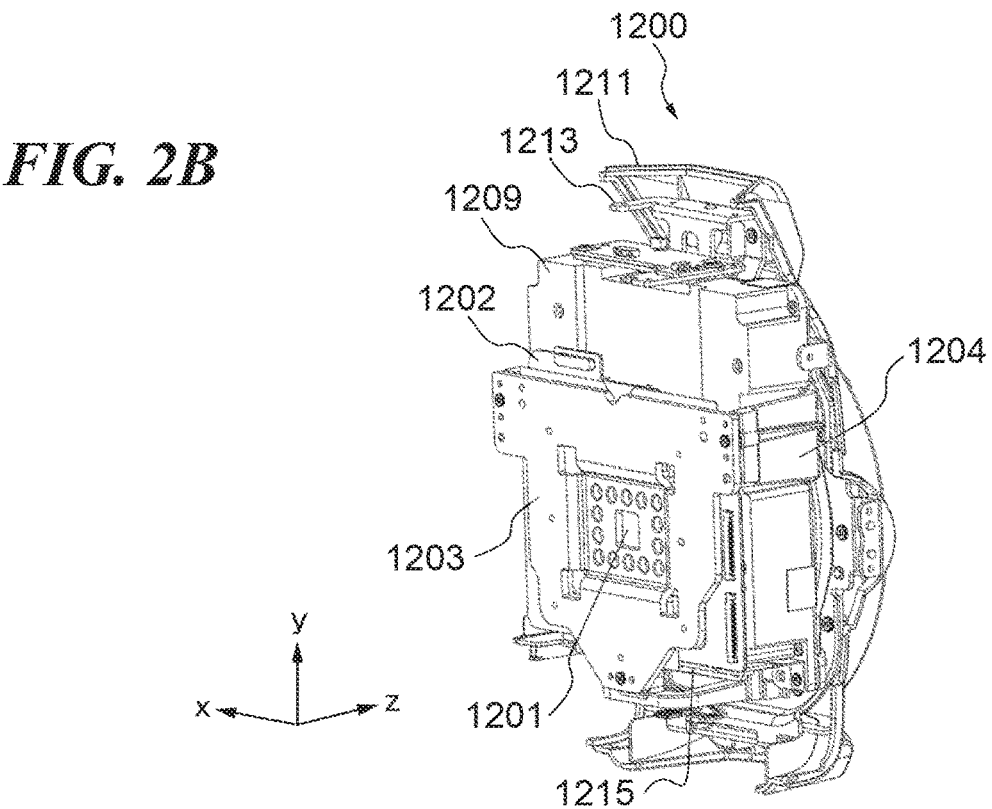
Figure 3:
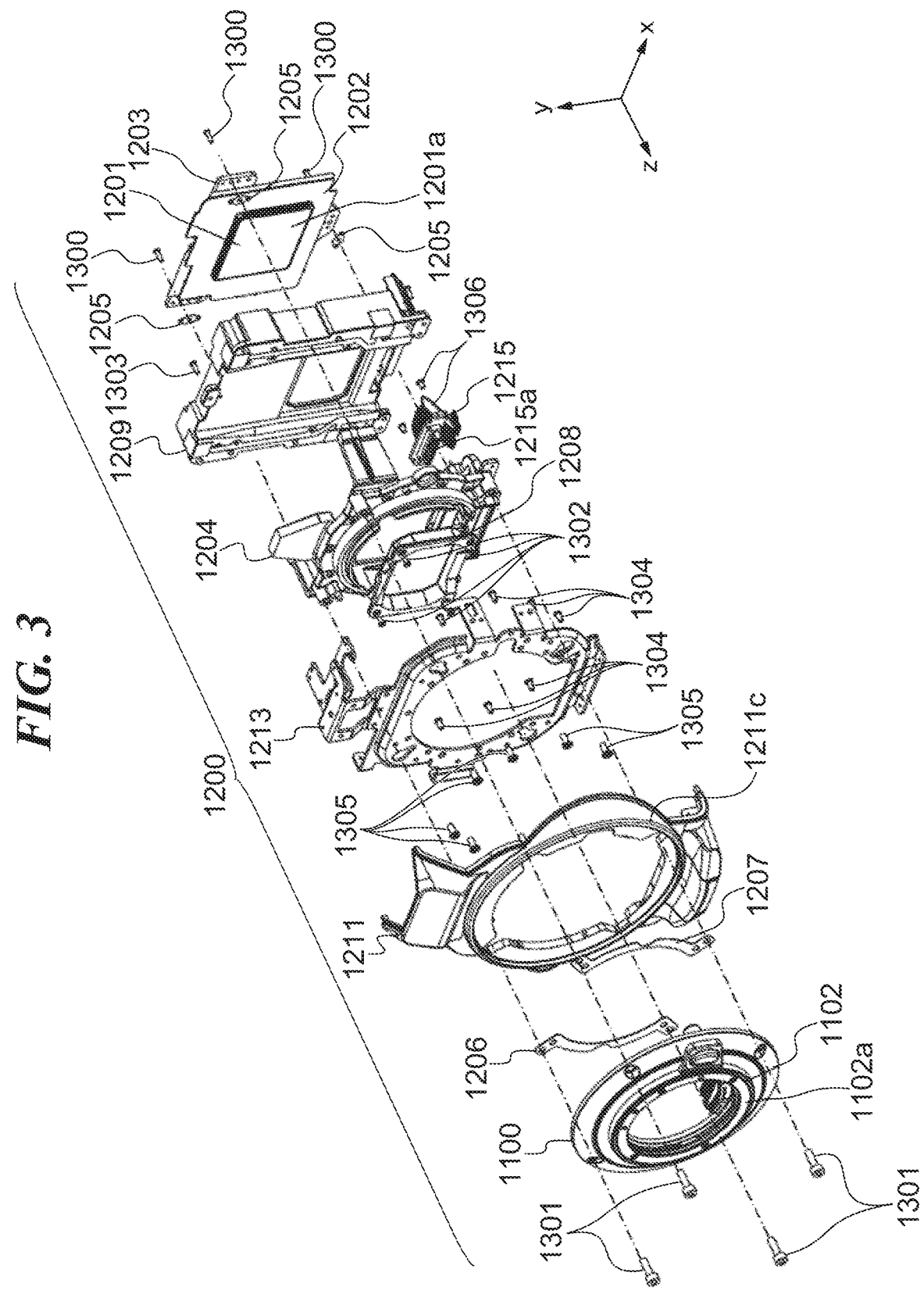
FIG. 3 is an exploded perspective view illustrating the front casing cover unit of the image pickup apparatus in FIGS. 1A to 1C.

FIGS. 2A and 2B are perspective views illustrating a front casing cover unit of the image pickup apparatus in FIGS. 1A to 1C. FIG. 2A is a front perspective view of the front casing cover unit, and FIG. 2B is a rear perspective view of the front casing cover unit. FIG. 3 is an exploded perspective view of the front casing cover unit. The front casing cover unit is disposed on a front side of the image pickup apparatus main body.

As shown in FIGS. 2A, 2B, and 3, the first mount unit 1100 is fixed to an image pickup device holding member 1204, which is located more inside than a ring-shaped guide rib 1211c formed on a front casing cover 1211 of the front casing cover unit 1200, by screws 1301 (see FIG. 1C as well). The image pickup device 1201 is electrically connected to an image pickup device board 1202 by soldering, and on the image pickup device board 1202, a video signal which is an output from the image pickup device 1201 is converted into a predetermined image signal. The image pickup device 1201 is also mechanically fixed to an image pickup device holding plate 1203 by an adhesive material or the like, and the image pickup device holding plate 1203 is fixed to the image pickup device holding member 1204 by screws 1300. The distance from a first mount surface 1102a of the first mount portion 1102 of the first mount unit 1100 to an image pickup device surface 1201a of the image pickup device 1201 is the flange back.

An internal adjustment washer 1205 is sandwiched between the image pickup device holding plate 1203 and the image pickup device holding member 1204, and when it is assembled, its thickness is adjusted so as to achieve a predetermined flange back. A first adjustment shim 1206 and a second adjustment shim 1207 with a predetermined thickness are removably sandwiched and held between the first mount unit 1100 and the image pickup device holding member 1204 so as to adjust the flange back when a user changes mount units. Detailed of the first adjustment shim 1206 and the second adjustment shim 1207 will be described later.

An optical component unit 1208 and an ND unit 1209 are disposed between the first mount unit 1100 and the image pickup device 1201. The optical component unit 1208 and the ND unit 1209 are fixed to the image pickup device holding member 1204 by screws 1302 and screws 1303, respectively. The ND unit 1209 includes a plurality of ND filters with different densities, not shown, which are optical components, and reducing incident light through the ND filters allows to widen the aperture and to reduce the shutter speed when taking a shot.

The front casing cover 1211 is fixed to a casing holding metal plate 1213 by screws 1304. The image pickup device holding member 1204 is fixed to the casing holding metal plate 1213 by screws 1305. Namely, the front casing cover 1211 and the image pickup device holding member 1204 are mechanically connected together via connecting portions of the casing holding metal plate 1213. The casing holding metal plate 1213 is molded of a plate material that has springiness. With this arrangement, even if an external force is applied to the image pickup apparatus main body 1000 or the front casing cover 1211, its effects can be reduced. Namely, since the front casing cover 1211 and the image pickup device holding member 1204 are fixed to each other via the casing holding metal plate 1213 that has springiness, the force transmitted to the image pickup device holding member 1204 can be reduced. Thus, even if an external force is applied to the image pickup apparatus main body 1000, effects such as deviation of the flange back can be reduced.

A main body side terminal unit 1215 is fixed to the image pickup device holding member 1204 by screws 1306. The first terminal unit 1103 and the main body side terminal unit 1215 are electrically connected together, and these electric connectors transmit a lens control signal from the first interchangeable lens 1400 attached to the image pickup apparatus main body 1000 to an internal board, which is not illustrated.

A description will now be given of an arrangement of the first mount unit 1100.

Figure 4A:
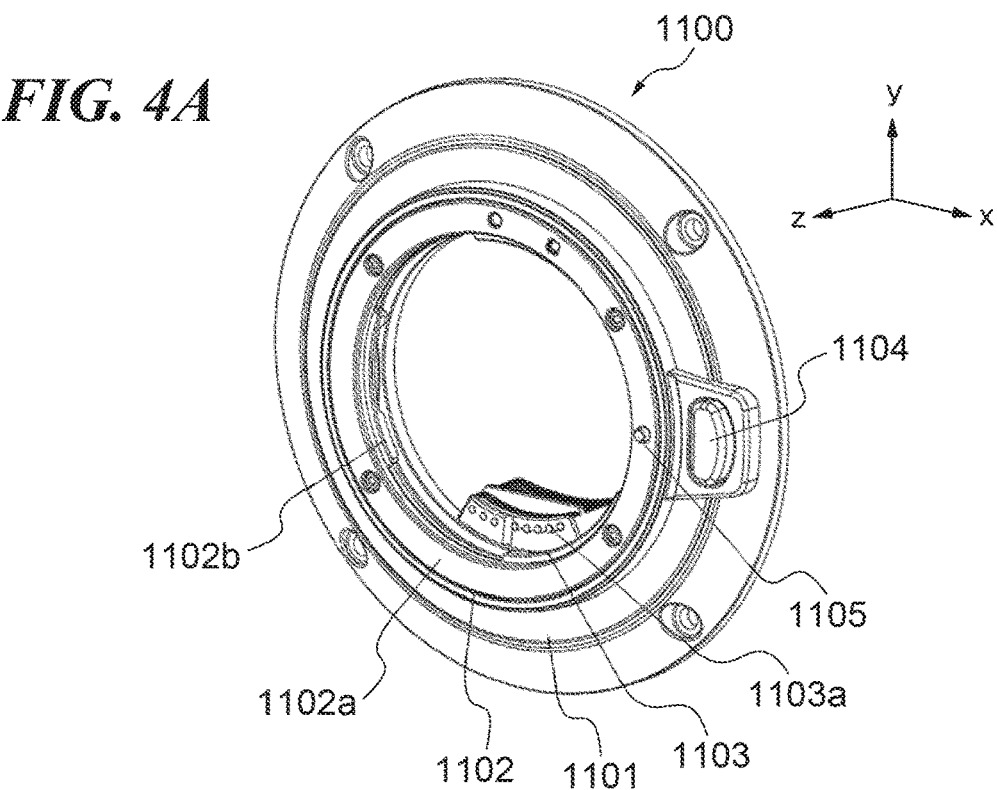
FIGS. 4A and 4B are perspective views illustrating a first mount unit that is attached to the image pickup apparatus in FIGS. 1A to 1C.
Figure 4B:
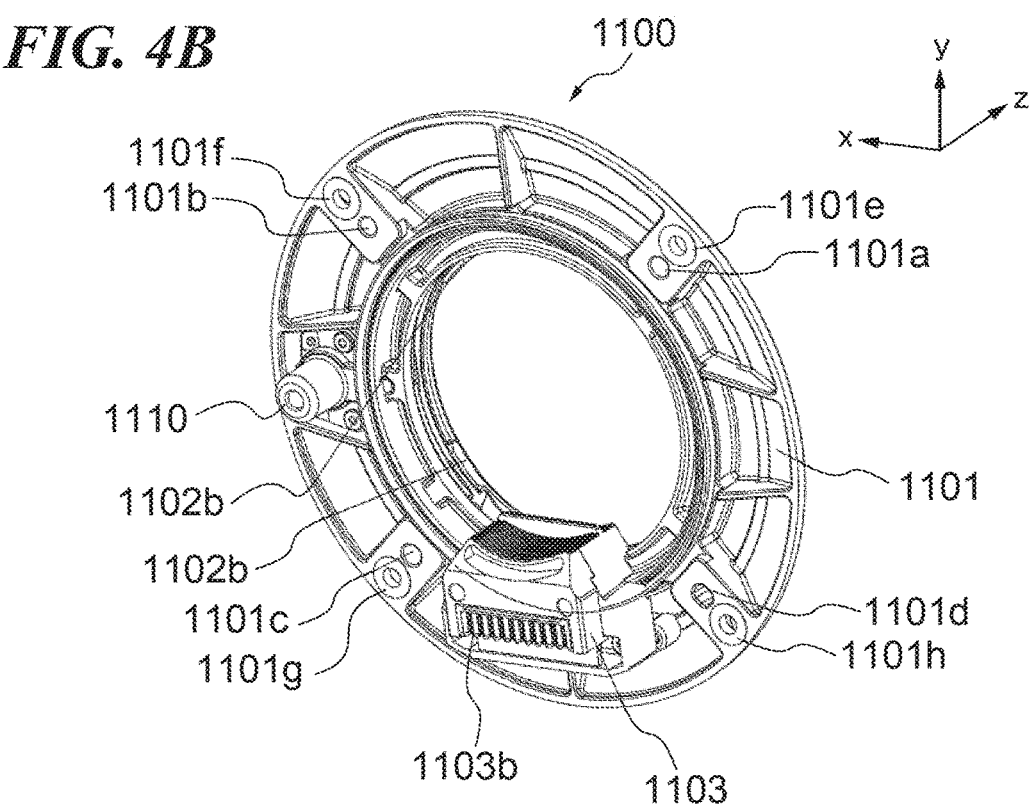
Figure 5A:
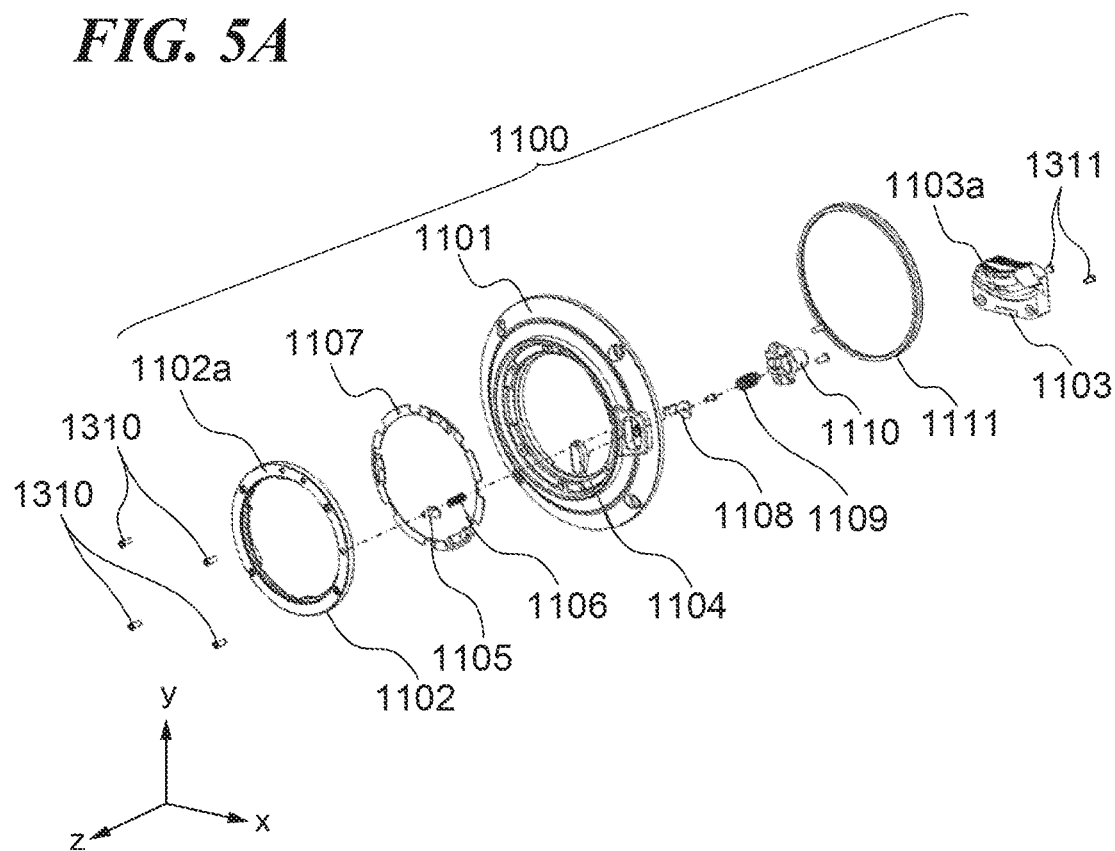
FIGS. 5A and 5B are exploded perspective views of the first mount unit that is attached the image pickup apparatus in FIGS. 1A to 1C.
Figure 5B:
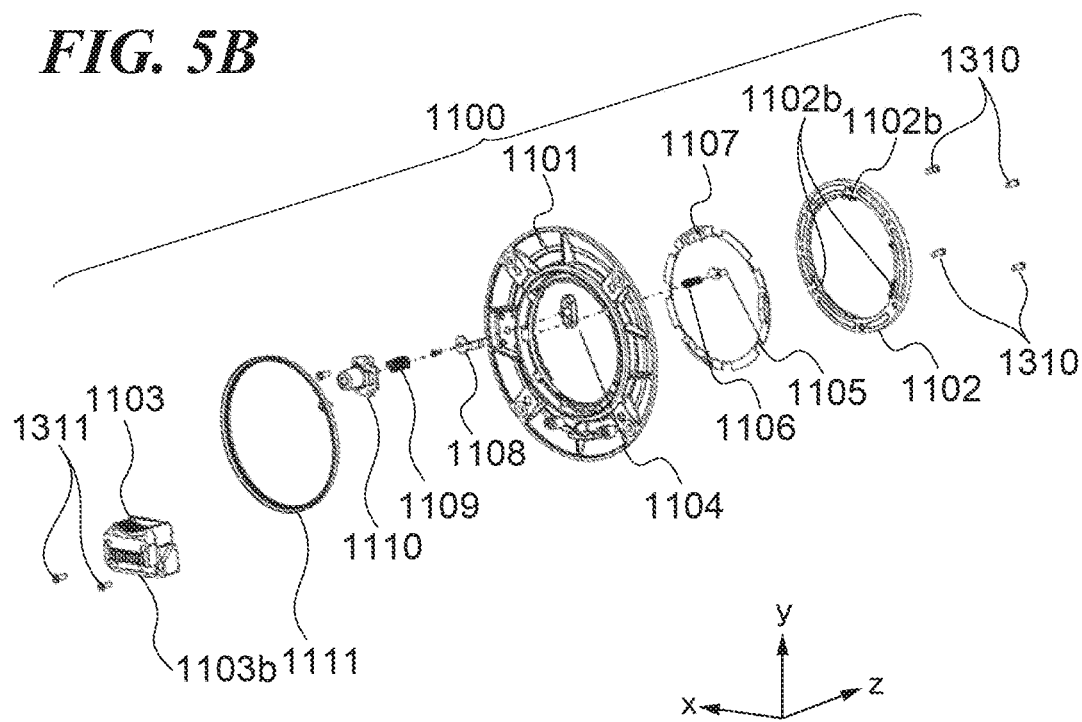

FIGS. 4A and 4B are perspective views illustrating the first mount unit that is attached to the image pickup apparatus in FIGS. 1A to 1C. FIG. 4A is a front perspective view of the first mount unit, and FIG. 4B is a rear perspective view of the first mount unit. FIGS. 5A and 5B are exploded perspective views of the first mount unit. FIG. 5A is a front exploded perspective view of the first mount unit, and FIG. 5B is a rear exploded perspective view of the first mount unit.

An outside shape of the first mount unit 1100 is formed by a first mount base 1101 molded by, for example, a magnesium die casting.

Referring to FIGS. 4A, 4B, 5A, and 5B, the first mount portion 1102 of the first mount unit 1100 is fixed to the first mount base 1101 by screws 1310. Three mount claw portions 1102b are formed on an inner periphery of the first mount portion 1102.

To mount the first interchangeable lens 1400 on the first mount unit 1100, a mount surface of the first interchangeable lens 1400 (see FIGS. 1A to 1C) and the first mount surface 1102a of the first mount portion 1102 are caused to abut against each other, and the first interchangeable lens 1400 is turned through a predetermined angle. As a result, the first interchangeable lens 1400 is mounted on the first mount unit 1100. The first mount unit 1100 constitutes a so-called bayonet type mount mechanism.

The first mount portion 1102 is provided with a lens lock pin 1105 for restricting a rotary motion at a position where the first interchangeable lens 1400 is mounted. A lens lock pin spring 1106 is disposed on a rear side of the lens lock pin 1105. The lens lock pin spring 1106 holds the lens lock pin 1105 such that the lens lock pin 1105 projects toward the first interchangeable lens 1400. When the first interchangeable lens 1400 is to be mounted on the first mount unit 1100, the lens lock pin 1105 is able to retract against an urging force of the lens lock pin spring 1106. In the state in which the first interchangeable lens 1400 is mounted on the first mount unit 1100, the lens lock pin 1105 restricts lens rotation by engaging with a lock hole formed at a predetermined location on the mount surface of the first interchangeable lens 1400, and the mount claw portions 1102b engage with corresponding claw portions of the lens mount. On the rear side of the first mount portion 1102, a lens mount spring 1107 is located. The lens mount spring 1107 abuts against the claw portions of the lens mount, which are engaged with the mount claw portions 1102b, to keep the mount surface of the first interchangeable lens 1400 and the first mount surface 1102a in abutment against each other.

The first interchangeable lens 1400 is removed in a manner described hereafter. The lens-release button 1104 is depressed, and a link mechanism 1108 depressed at the same time causes the lens lock pin 1105 to retract from the first mount surface 1102a. In this state, the first interchangeable lens 1400 is detached from the first mount unit 1102 by turning the first interchangeable lens 1400 through a predetermined angle in a direction opposite to the direction in which it is turned to be mounted. A lens-release button spring 1109 and a spring receiving unit 1110 are provided on a rear side of the lens-release button 1104, and they urge the lens-release button 1104 toward the first interchangeable lens 1400 and hold it. A dust-proof rubber 1111 is attached to a rear side of the first mount base 1101. When the first mount unit 1100 is fixed to the image pickup apparatus main body 1000, the dust-proof rubber 1111 abuts against the image pickup device holding member 1204 to prevent the entry of dust.

The first terminal unit 1103 is fixed to the first mount base 1101 by screws 1311. The first terminal unit 1103 includes a lens side terminal 1103a on a lens side and a main body side terminal 1103b on a main body side, and both of them are connected together via a circuit board, which is not illustrated, in the first terminal unit 1103.

In the state in which the first mount unit 1100 is fixed to the image pickup apparatus main body 1000, the main body side terminal 1103b of the first terminal unit 1103 is electrically connected to a connecting terminal 1215a (see FIG. 3) of the main body side terminal 1215. Thus, when the first interchangeable lens 1400 is mounted on the first mount unit 1100, a terminal portion of the first interchangeable lens 1400 is connected to the lens side terminal 1103a of the first terminal unit 1103. Also, the main body side terminal 1103b of the first terminal unit 1103 and the connecting terminal 1215a are connected together, so that lens control signals can be transmitted to the board inside the image pickup apparatus main body. This enables lens control operations such as zooming and focusing.

A description will now be given of the image pickup apparatus main body and the first mount unit, which is attached to the image pickup apparatus main body.

Figure 6A:
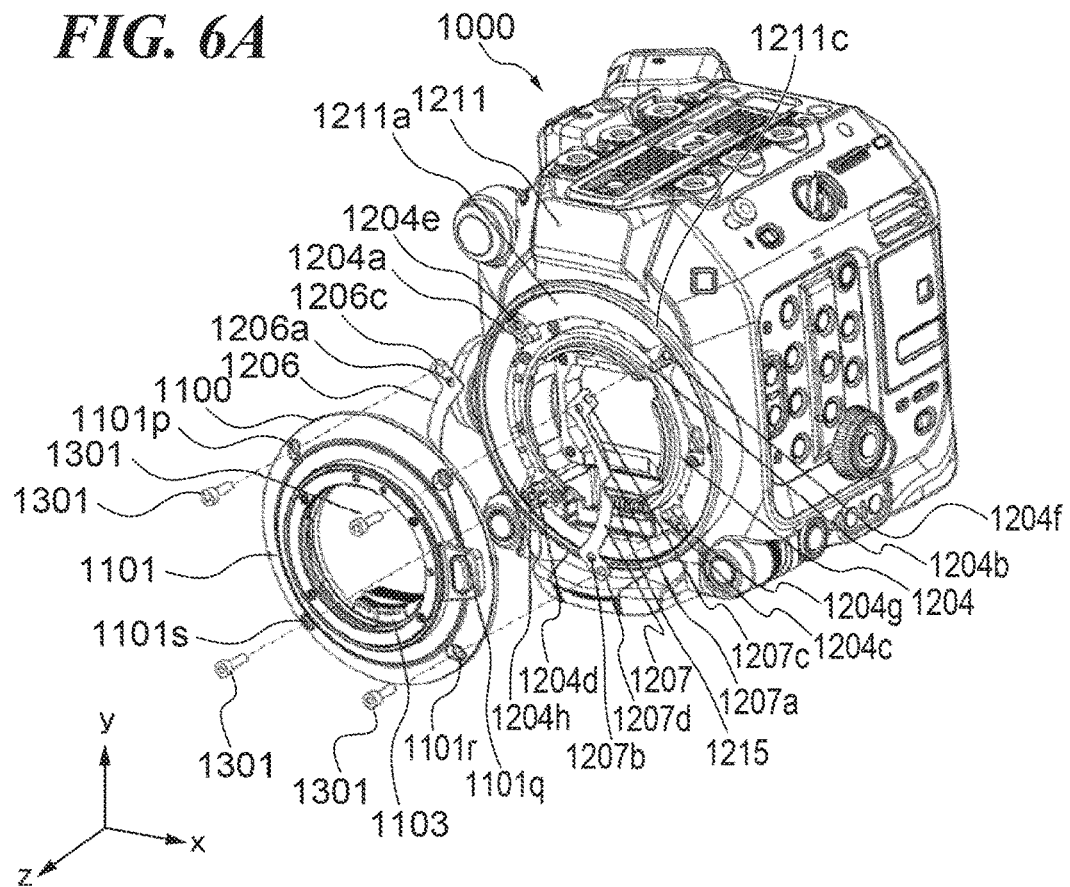
FIGS. 6A and 6B are views illustrating a state in which the first mount unit has been detached from the image pickup apparatus in FIGS. 1A to 1C.
Figure 6B:
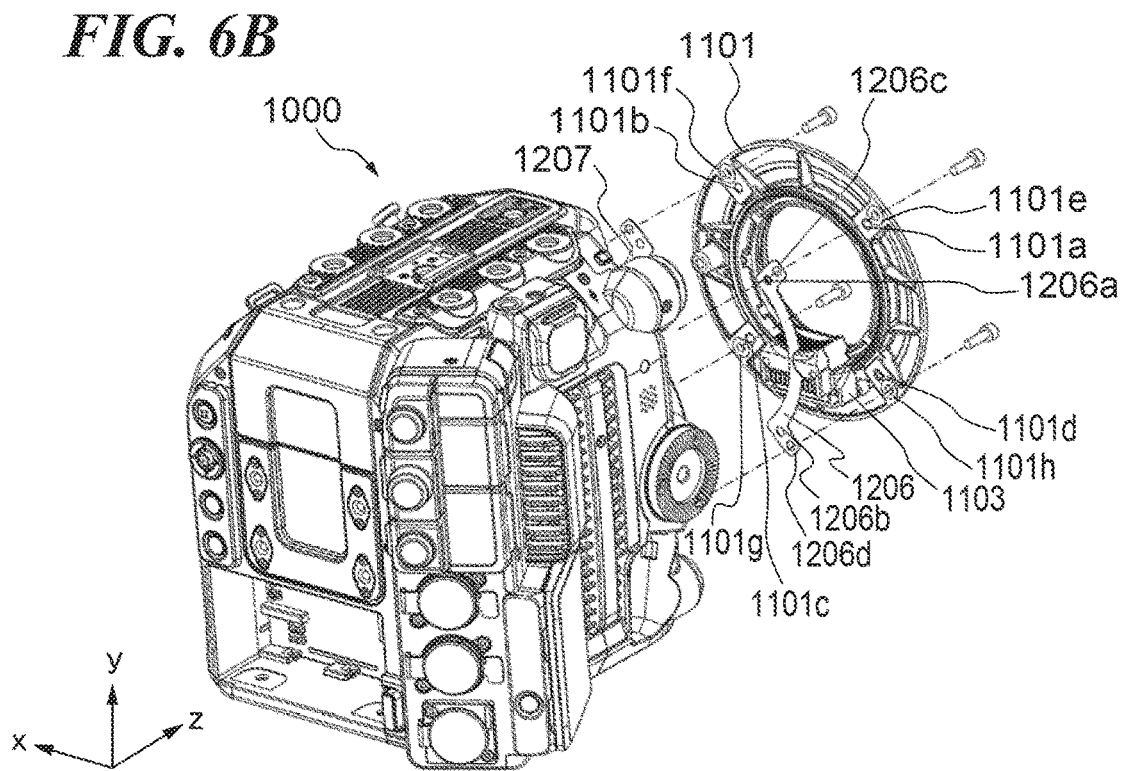

FIGS. 6A and 6B are views illustrating a state in which the first mount unit has been removed from the image pickup apparatus in FIGS. 1A to 1C. FIG. 6A is a front perspective view of the state in which the first mount unit has been removed, and FIG. 6B is a rear perspective view of the state in which the first mount unit has been removed.

Referring to FIGS. 6A and 6B, the first mount unit 1100 is fixed to the image pickup apparatus main body 1000 by fastening four screws 1301 to four fixing portions 1101p to 1101s of the first mount base 1101. In other words, by removing the four screws 1301, the first mount unit 1100 can be detached from the image pickup apparatus main body 1000.

The first mount unit 1100 is fixed to the image pickup device holding member 1204 inside the image pickup apparatus main body 1000. A position at which the first mount unit 1100 is fixed is defined by fitting four positioning pins 1204a to 1204d of the image pickup device holding member 1204 into four positioning holes 1101a to 1101d (see FIG. 4B) of the first mount base 1101. The positioning pins 1204a to 1204d and the positioning holes 1101a to 1101d are disposed in a circumferential direction of the image pickup device holding member 1204 and the first mount unit 1100. The first mount unit 1100 is housed inside the ring-shaped guide rib 1211c formed on the front casing cover 1211 of the image pickup apparatus main body 1000 to form an outer appearance of the image pickup apparatus. It should be noted that as the image pickup apparatus main body 1000 is seen from the front (that is, the front casing cover 1211 side), an exposure opening in which the image pickup device 1201 is provided is located inside the ring-shaped guide rib 1211c.

The first adjustment shim 1206 and the second adjustment shim 1207 are sandwiched and held between the first mount unit 1100 and the image pickup device holding member 1204. The first adjustment shim 1206 and the second adjustment shim 1207 are set in such a manner as to be overlapped with and fit within an outside shape of the first mount unit 1100, on a projection surface in a case of viewing the image pickup apparatus main body 1000 from the front side in a direction of an optical axis. Namely, the first adjustment shim 1206 and the second adjustment shim 1207 can be removed by detaching the first mount unit 1100 from the image pickup apparatus main body 1000. The first adjustment shim 1206 and the second adjustment shim 1207 act as flange back adjustment members.

The first adjustment shim 1206 and the second adjustment shim 1207 are formed of thin sheets made of a metallic material and have two positioning holes 1206a and 1206b and two positioning holes 1207a and 1207b, respectively. The first adjustment shim 1206 and the second adjustment shim 1207 are each positioned at two points by fitting into two neighboring ones of the four positioning pins 1204a to 1204d of the image pickup device holding member 1204. Namely, positioning of the first adjustment shim 1206 and the second adjustment shim 1207 and the first mount unit 1100 with respect to the image pickup device holding member 1204 is implemented by the positioning pins 1204a to 1204d which are the same positioning portions.

The four positioning pins 1204a to 1204d of the image pickup device holding member 1204 are disposed in the circumferential direction and vertically and horizontally symmetric with respect to the optical axis of the image pickup apparatus main body 1000. The first adjustment shim 1206 and the second adjustment shim 1207 have the same shape, and they are symmetric with respect to a line. Thus, the first adjustment shim 1206 and the second adjustment shim 1207 may be disposed such that they face the image pickup apparatus main body 1000 at four locations on upper, lower, right and left sides (the first adjustment shim 1206 and the second adjustment shim 1207 may be disposed at respective two locations facing each other on an outer periphery of the image pickup device holding member 1204 or the first mount unit 1100) and symmetrically front and back.

It should be noted that in the first embodiment, the first adjustment shim 1206 and the second adjustment shim 1207 are disposed at such locations (upper, right, and left) as not to interfere with the first terminal unit 1103 of the first mount unit 1100. In the example illustrated in FIG. 6A, the first adjustment shim 1206 is disposed on the left side, and the second adjustment shim 1207 is disposed on the right side. The positioning holes 1206a and 1206b of the first adjustment shim 1206 are fitted on the positioning pins 1204a and 1204d, respectively, of the image pickup device holding member 1204. The positioning pins 1207a and 1207b of the second adjustment shim 1207 are fitted on the positioning pins 1204b and 1204c, respectively, of the image pickup device holding member 1204.

The first adjustment shim 1206 and the second adjustment shim 1207 are substantially arc-shaped members in the form of thin sheets, and the substantially arc-shaped members include thickness adjustment portions 1206c and 1206d and thickness adjustment portions 1207c and 1207d, respectively, at their ends. The arc-shaped first adjustment shim 1206 and the arc-shaped second adjustment shim 1207 partially cover the ring-shaped face of the first mount unit 1100 in the circumferential direction of the first mount unit 1100. In the first adjustment shim 1206, the positioning hole 1206a is disposed close to and inside (inside in the direction close to the optical axis) the thickness adjustment portion 1206c, and the positioning hole 1206b is disposed inside and close to the thickness adjustment portion 1206d. In the second adjustment shim 1207, the positioning hole 1207a is disposed inside and close to the thickness adjustment portion 1207c, and the positioning hole 1207b is disposed inside and close to the thickness adjustment portion 1207d.

Bearing faces 1205e to 1205h of the image pickup device holding member 1204 are disposed in this order close to and outside (outside in the direction close to the optical axis) the positioning pins 1204a to 1204d (areas facing the four positioning holes 1101a to 1101d formed in the first mount base 1101). Namely, when the first adjustment shim 1206 and the second adjustment shim 1207 are held by the image pickup device holding member 1204, the thickness adjustment portion 1206c of the first adjustment shim 1206 overlaps the bearing face 1204e, and the thickness adjustment portion 1207c of the second adjustment shim 1207 overlaps the bearing face 1204f. Also, the thickness adjustment portion 1207d of the second adjustment shim 1207 overlaps the bearing face 1204g, and the thickness adjustment portion 1206d of the first adjustment shim 1206 overlaps the bearing face 1204h.

A description will now be given of how the adjustment shims are attached to the image pickup apparatus.

Figure 7:
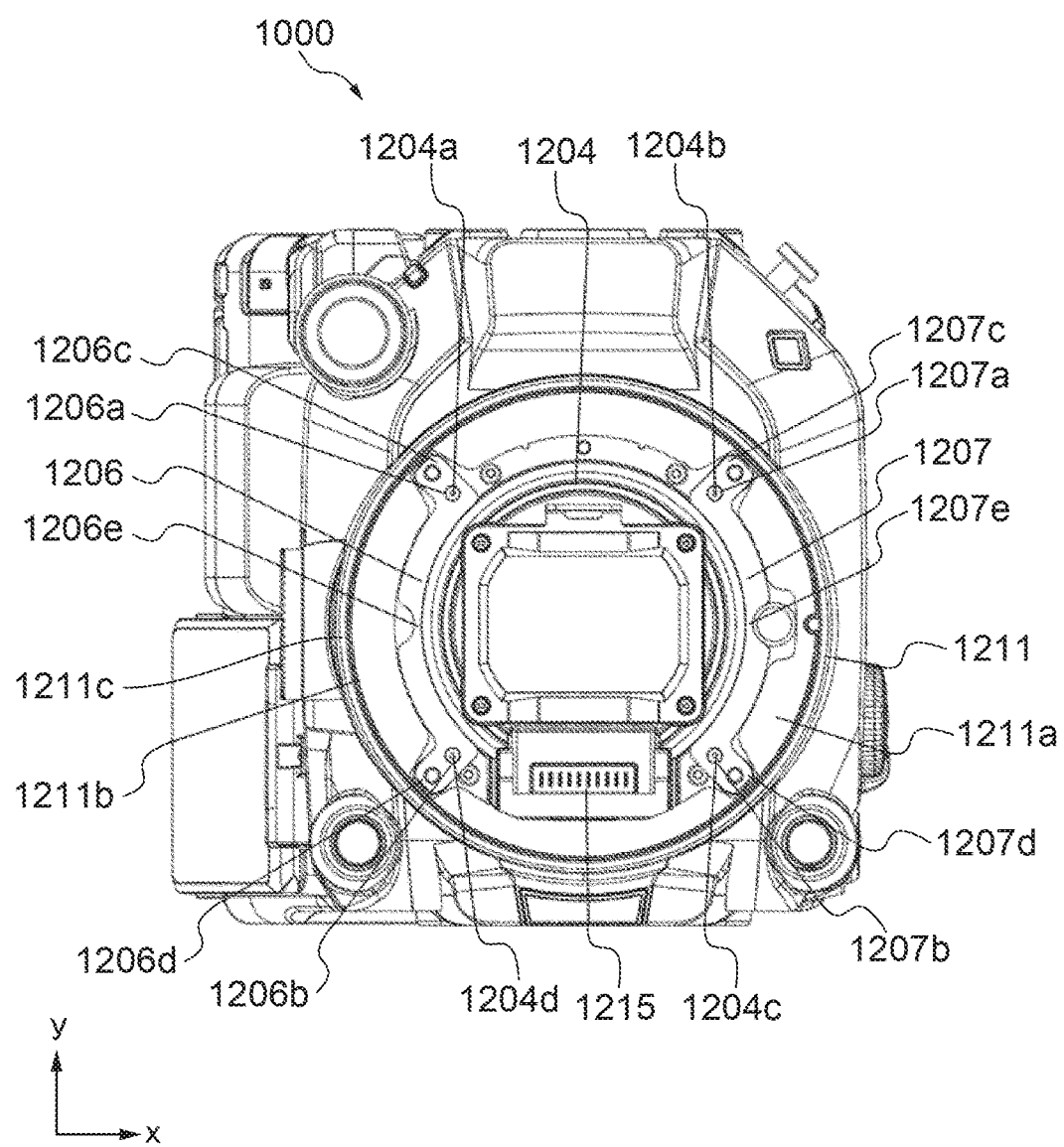
FIG. 7 is a front view illustrating a state in which the first mount unit has been detached from the image pickup apparatus in FIGS. 1A to 1C, and adjustment shims have been attached to the image pickup apparatus in FIGS. 1A to 1C.

FIG. 7 is a front view illustrating a state in which the first mount unit has been detached from the image pickup apparatus in FIGS. 1A to 1C, and the adjustment shims have been attached to the image pickup apparatus in FIGS. 1A to 1C.

Referring to FIG. 7, one first adjustment shim 1206 is set on a left side of the image pickup apparatus main body 1000, and one second adjustment shim 1207 are set on a right side of the image pickup apparatus main body 1000. The first adjustment shim 1206 and the second adjustment shim 1207 have the same shape and the same thickness, and in the state in which they are set on the image pickup apparatus main body 1000 at the two locations on the right and left as described earlier, they adjust the flange back in a parallel manner in the direction of the thickness of the image pickup apparatus main body 1000, in other words, in the direction of the optical axis. Using the two adjustment shims having the above-described shape, which are the first adjustment shim 1206 and the second adjustment shim 1207, leads to reduced cost because it improves the ease of material cutting for components as compared to the case where a single ring-shaped adjustment shim is used like the prior art.

Moreover, as illustrated in FIGS. 6A, 6B, and 7, the front casing cover 1211 includes a concave face 1211a that is located more inside than the ring-shaped guide rib 1211c in a direction perpendicular to the optical axis (inside in the direction close to the optical axis) and hollowed toward the image pickup device 1201 as compared with an upper face of the guide rib 1211c. The first adjustment shim 1206 and the second adjustment shim 1207 are disposed so as not to overlap the concave face 1211a of the front casing cover 1211 when they are seen in the direction of the optical axis in the state of being fitted on the positioning pins 1204a to 1204d of the image pickup device holding member 1204. As a result, when the first mount unit 1100 is interchanged with another, the first adjustment shim 1206 and the second adjustment shim 1207 can also be interchanged with others without removing the front casing cover 1211.

Between a part of the first adjustment shim 1206 other than its thickness adjustment portions, that is, a part other than the thickness adjustment portions 1206c and 1206d, and the image pickup device holding member 1204, there is a space (clearance) on a rear side in a state in which the first adjustment shim 1206 is attached to the image pickup apparatus main body 1000. Also, between a part of the second adjustment shim 1207 other than its thickness adjustment portions, that is, a part other than the thickness adjustment portions 1207c and 1207d, and the image pickup device holding member 1204, there is a space (clearance) on a rear side in a state in which the first adjustment shim 1207 is attached to the image pickup apparatus main body 1000. Namely, the image pickup device holding member 1204 and the first mount unit 1100 hold the thickness adjustment portion of the first adjustment shim 1206 or the second adjustment shim 1207a put between them with a space made between a part of the first adjustment shim 1206 or the second adjustment shim 1207 other than the thickness adjustment portions and one of the image pickup device holding member 1204 and the first mount unit 1100. With this arrangement, the first adjustment shim 1206 and the second adjustment shim 1207 can be easily detached from the image pickup apparatus main body 1000. Moreover, to make it easier to attach and detach the first adjustment shim 1206 and the second adjustment shim 1207 to and from the image pickup apparatus main body 1000, pulling portions 1206e and 1207e which are cut portions are formed in substantially the central parts of the first adjustment shim 1206 and the second adjustment shim 1207, respectively. As seen in the direction of the optical axis, the pulling portions 1206e and 1207e do not overlap the concave face 1211a of the front casing cover 1211, and the user can detach the first adjustment shim 1206 and the second adjustment shim 1207 from the image pickup apparatus main body 1000 by holding the pulling portions 1206e and 1207e with fingers or tweezers.

On an outer periphery of the concave face 1211a of the front casing cover 1211, a groove portion 1211b that has a concave shape in cross section is provided along the entire circumference of the outer periphery. The first mount unit 1100 is fixed to the image pickup device holding member 1204 via the first adjustment shim 1206 and the second adjustment shim 1207 interposed between them. Thus, when the first mount unit 1100 is to be attached to the image pickup apparatus main body 1000, there is a predetermined space between the first mount unit 1100 and the front casing cover 1211 in the direction of the optical axis before the first mount unit 1100 is fastened by the screws 1301. Accordingly, the groove portion 1211b that has the concave shape in cross section is formed along the entire circumference of the concave face 1211a as described above. When the first mount unit 1100 is attached to the image pickup apparatus main body 1000, on a projection surface in a case of viewing the mount unit 1100 from the optical axis, an outer periphery of the first mount unit 1100 overlaps the groove portion 1211b. As a result, when the first mount unit 1100 is attached to the image pickup apparatus main body 1000 and fastened by the screws 1301, the concave groove portion 1211b prevents the entry of light, dust, and so forth into the image pickup apparatus main body 1000. Namely, by providing the groove portion 1211b that has the concave shape in cross section on the outer periphery of the concave face 1211a of the front casing cover 1211, a simple dust-proof and dripproof structure can be formed without increasing the number of components.

A description will now be given of how a second mount unit is attached to the image pickup apparatus main body 1000 when the mounts units are interchanged.

Figure 8A:
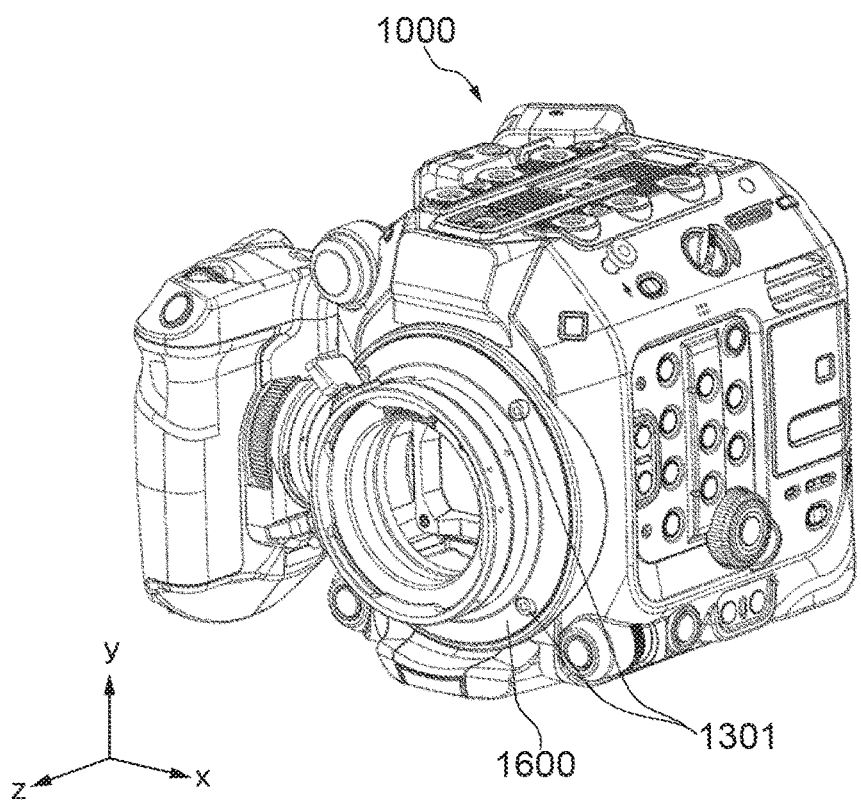
FIGS. 8A and 8B are perspective views illustrating a state in which a second mount unit has been attached to the image pickup apparatus in FIGS. 1A to 1C.
Figure 8B:
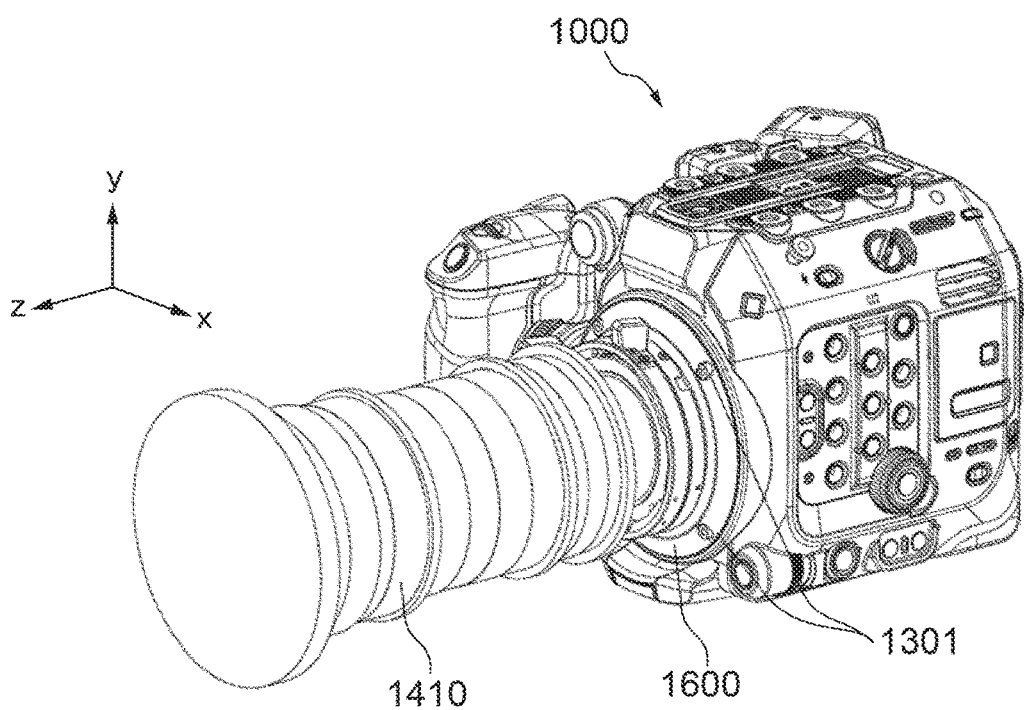

FIGS. 8A and 8B are perspective views illustrating a state in which the second mount unit is attached to the image pickup apparatus in FIGS. 1A to 1C. FIG. 8A is a front perspective view illustrating the state in the second mount unit is attached to the image pickup apparatus main body, and FIG. 8B is a front perspective view illustrating the state in the second mount unit and the second interchangeable lens are attached to the image pickup apparatus main body.

As shown in FIGS. 8A and 8B, the second mount unit 1600 is fixed to a front side of the image pickup apparatus main body 1000 by the four screws 1301. The second interchangeable lens 1410 is attached to the second mount unit 1600. The second interchangeable lens 1410 is a lens which has an electric terminal and a flange back different from those of the first interchangeable lens 1400 described above. The user who wants to use the second interchangeable lens 1410 detaches the first mount unit 1100 from the image pickup apparatus main body 1000 and attaches the second mount unit 1600 to the image pickup apparatus main body 1000. Detailed description of how to interchange the mount units will be given later.

A description will now be given of an arrangement of the second mount unit.

Figure 9A:
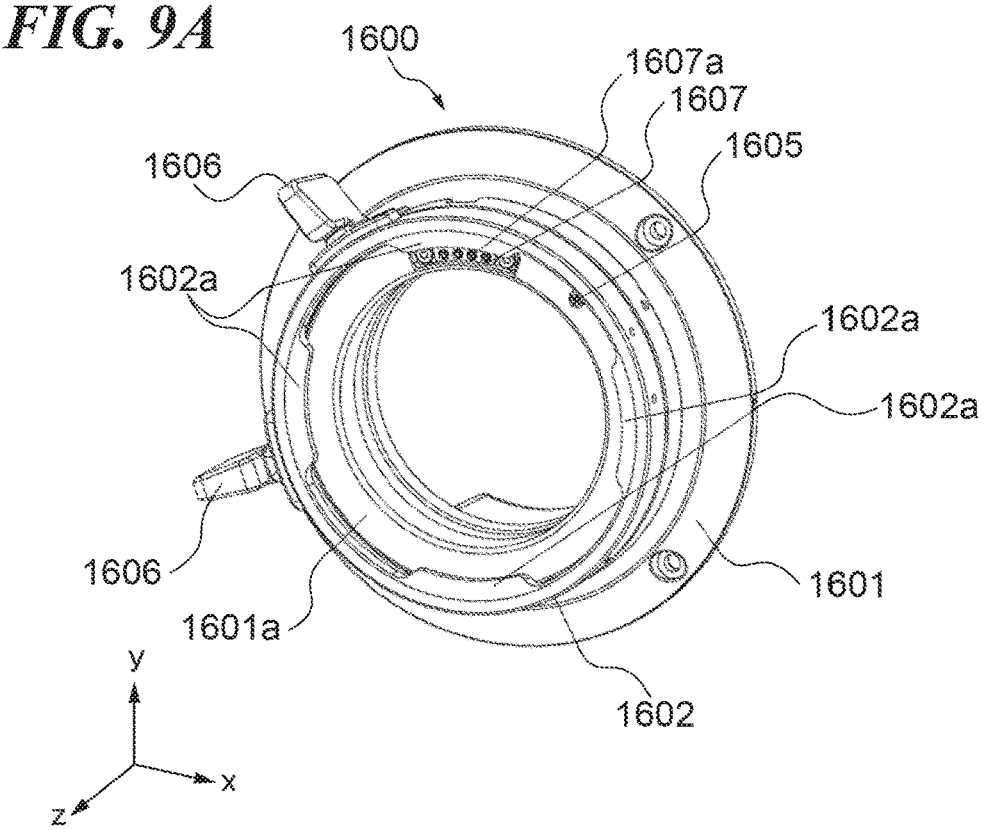
FIGS. 9A and 9B are perspective views illustrating the second mount unit.
Figure 9B:
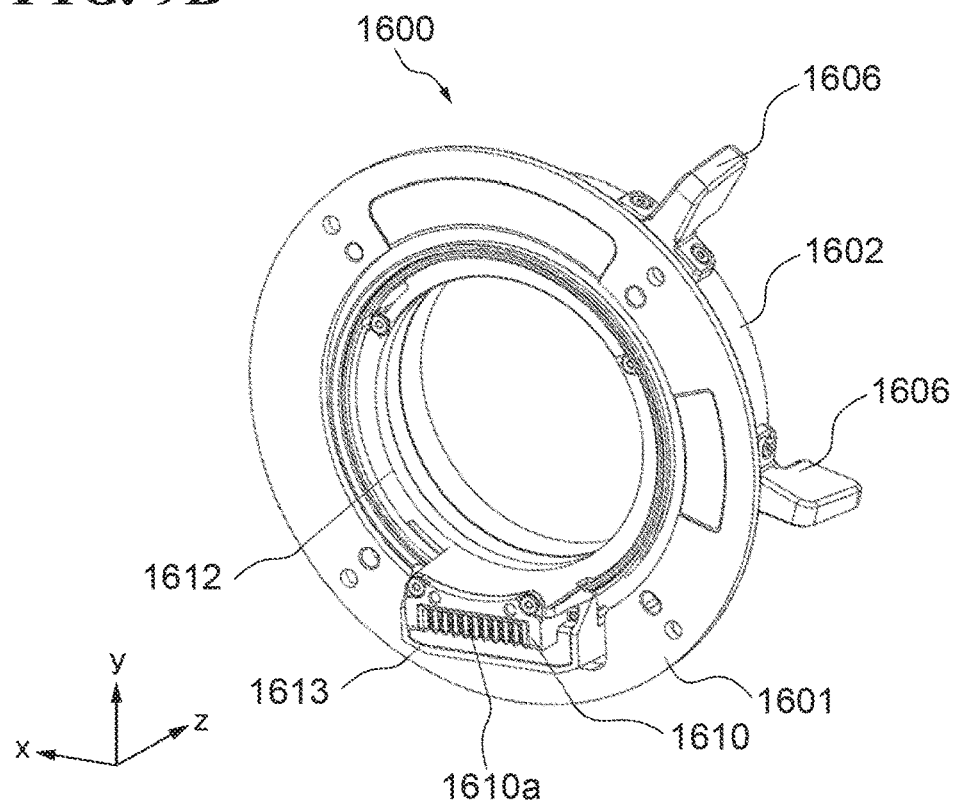
Figure 10A:
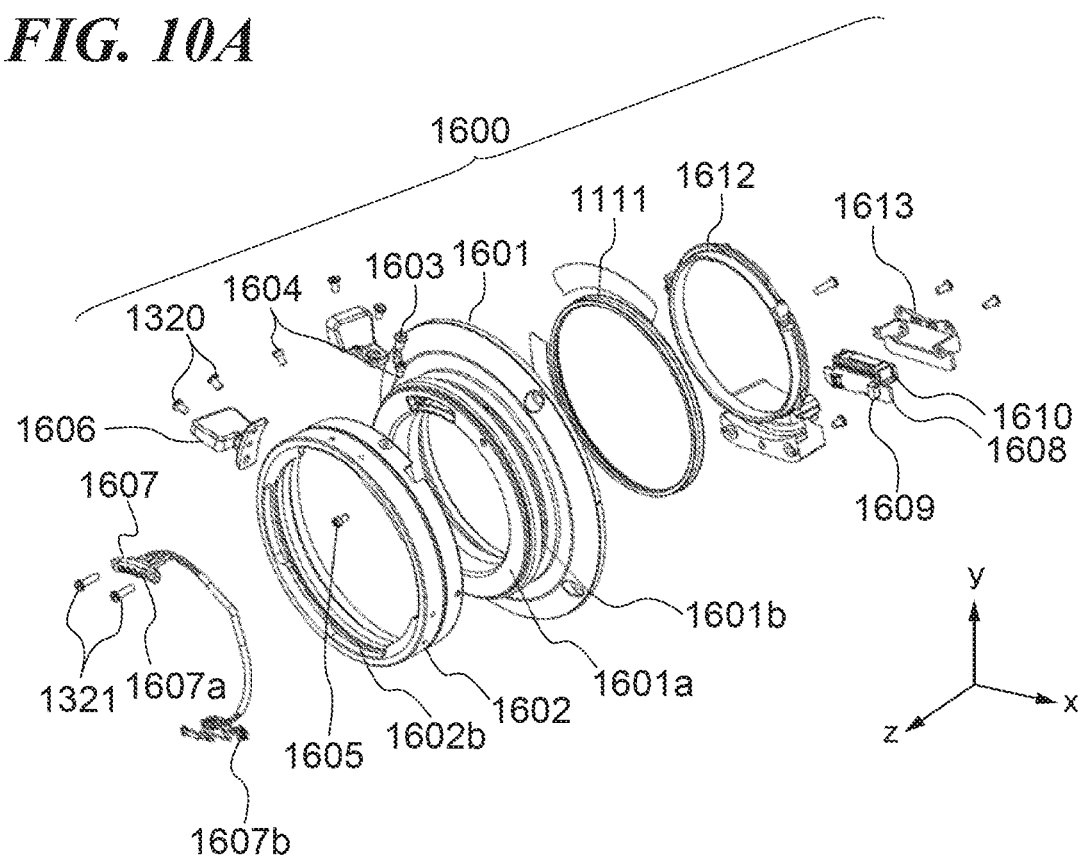
FIGS. 10A and 10B are exploded perspective views illustrating the second mount unit.
Figure 10B:
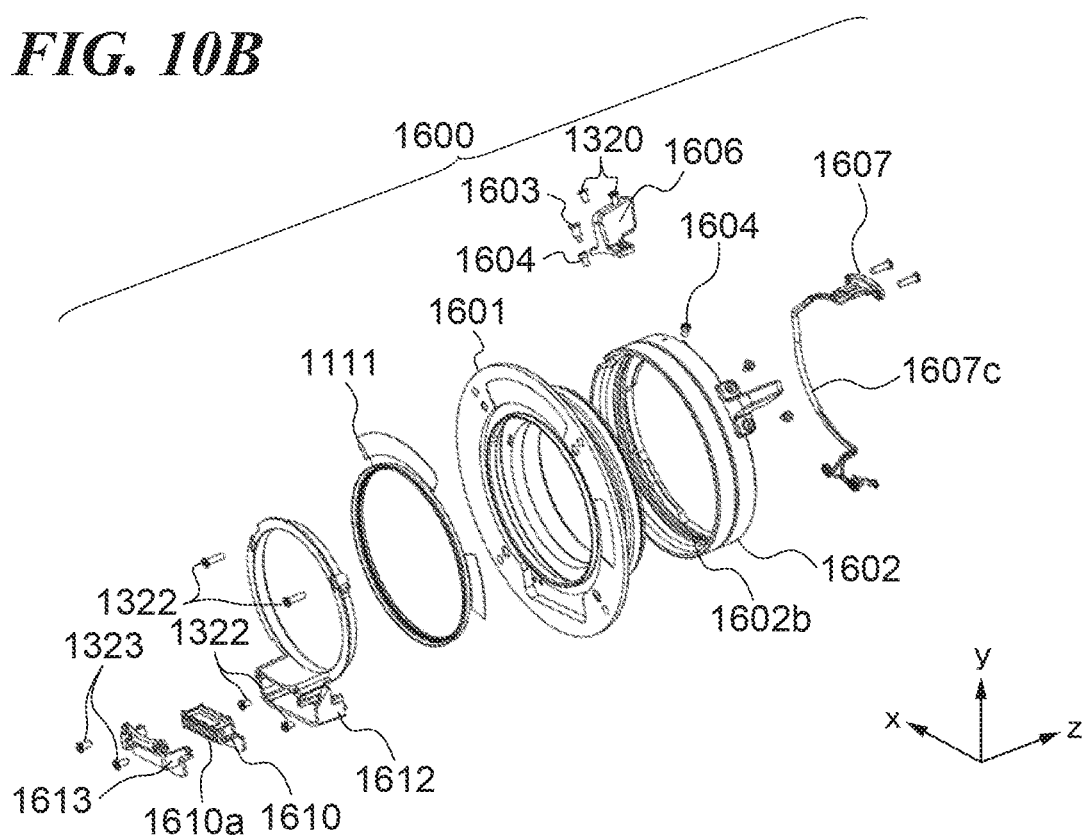

FIGS. 9A and 9B are perspective views illustrating the second mount unit. FIG. 9A is a front perspective view of the second mount unit, and FIG. 9B is a rear perspective view of the second mount unit. FIGS. 10A and 10B are exploded perspective views of the second mount unit. FIG. 10A is a front exploded perspective view of the second mount unit, and FIG. 10B is a rear exploded perspective view of the second mount unit.

An outside shape of the second mount unit 1600 is formed by a second mount base 1601 molded of, for example, stainless steel.

Referring to FIGS. 9A, 9B, 10A, and 10B, the second mount base 1601 of the second mount unit 1600 includes a second mount surface 1601a against which a mount surface of the second interchangeable lens 1410 is caused to abut. A second mount blade 1602 includes a female thread portion 1602b formed on an inner side thereof, and the female thread portion 1602b is engaged with a male thread portion 1601b of the second mount base 1601. The second mount blade 1602 is rotatable within a limited range in which a stopper pin 1603 fixed to the second mount blade 1602 by screwing abuts against two stopper screws 1604 screwed to the second mount base 1601. In this rotational range, translational motion of the second mount blade 1602 in the direction of the optical axis occurs in the state of being screwed with the second mount base 1601.

Four mount claw portions 1602a are formed on an inner periphery of the second mount blade 1602. The second interchangeable lens 1410 is attached to the second mount unit 1600 by causing the mount surface of the second interchangeable lens 1410 to abut against the second mount surface 1601a of the second mount unit 1600 and rotating the second mount blade 1602 through a predetermined angle. Then, by engaging a flange portion of the second interchangeable lens 1410 with the mount claw portions 1602a, the second interchangeable lens 1410 is fixed to the second mount unit 1600 attached to the image pickup apparatus main body 1000. The second mount unit 1600 constitutes what is called a spigot type mount mechanism.

A lens lock pin 1605 (FIG. 9A) for restricting a position at which the second interchangeable lens 1410 is mounted is screwed to the second mount base 1601. Two mount knobs 1606 are fixed to an outer side of the second mount blade 1602 by screws 1320, and by operating the mount knobs 1606, the second mount blade 1602 can be easily rotated when the second interchangeable lens 1410 is attached to and detached from the second mount unit 1600.

A second terminal unit 1607 is fixed to the second mount base 1601 by screws 1321. The second terminal unit 1607 includes a lens side terminal 1607a on the second interchangeable lens 1410 side and includes a connector plug 1607b on the opposite side. A second mounting board 1608 includes a connector socket 1609, which is connected to the connector plug 1607b of the second terminal unit 1607, on the lens side and includes a contact block 1610, which is connected to the main body side terminal unit 1215, on the main body side.

In the state in which the second mount unit 1600 is fixed to the image pickup apparatus main body 1000, a contact block terminal 1610a of the contact block 1610 is electrically connected to the connecting terminal 1215a of the main body side terminal unit 1215. Thus, when the second interchangeable lens 1410 is mounted on the second mount unit 1600, a terminal portion of the second interchangeable lens 1410 is connected to the lens side terminal 1607a of the second terminal unit 1607. Also, the contact block terminal 1610a and the connecting terminal 1215a are connected together. As a result, a lens control signal is transmitted to the internal board in the image pickup apparatus main body 1000. The contact block terminal 1610a of the contact block 1610 has the same shape and is disposed at the same location as the main body side terminal 1103b and is similarly connectable with the connecting terminal 1215a of the main body side terminal unit 1215.

A connecting wire 1607c of the second terminal unit 1607 is housed in a wire holder 1612 which is fixed to the second mount base 1601 by screws 1322. A board holder 1613 is fixed to the wire holder 1612 by screws 1323. The second mounting board 1608 is sandwiched and held between the wire holder 1612 and the board holder 1613. The dust-proof rubber 1111 is attached to a rear side of the second mount base 1601, and as with the first mount unit 1100 described above, abuts against the image pickup device holding member 1204 to prevent the entry of dust into the image pickup apparatus main body 1000.

A description will now be given of the image pickup apparatus main body and the second mount unit which is attached to the image pickup apparatus main body.

Figure 11A:
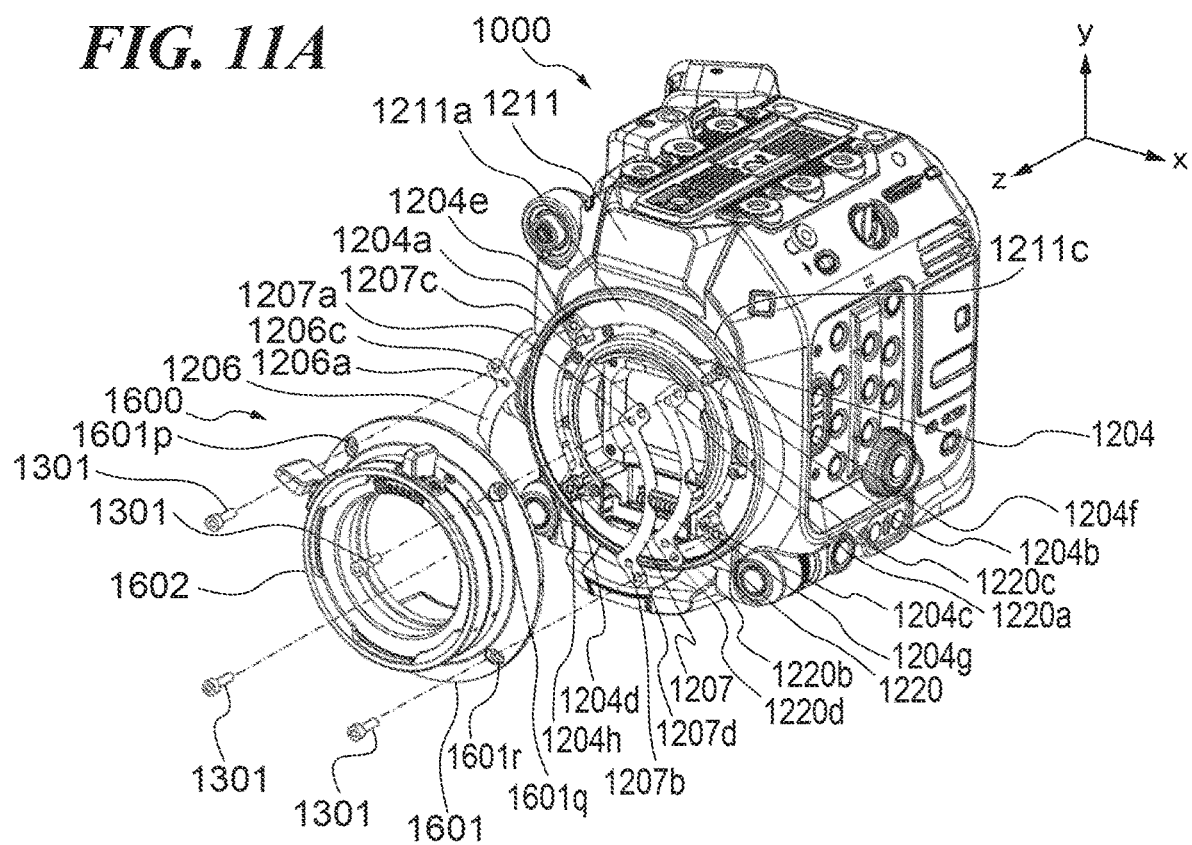
FIGS. 11A and 11B are perspective views illustrating a state in which the second mount unit is being attached to the image pickup apparatus in FIGS. 1A to 1C.
Figure 11B:
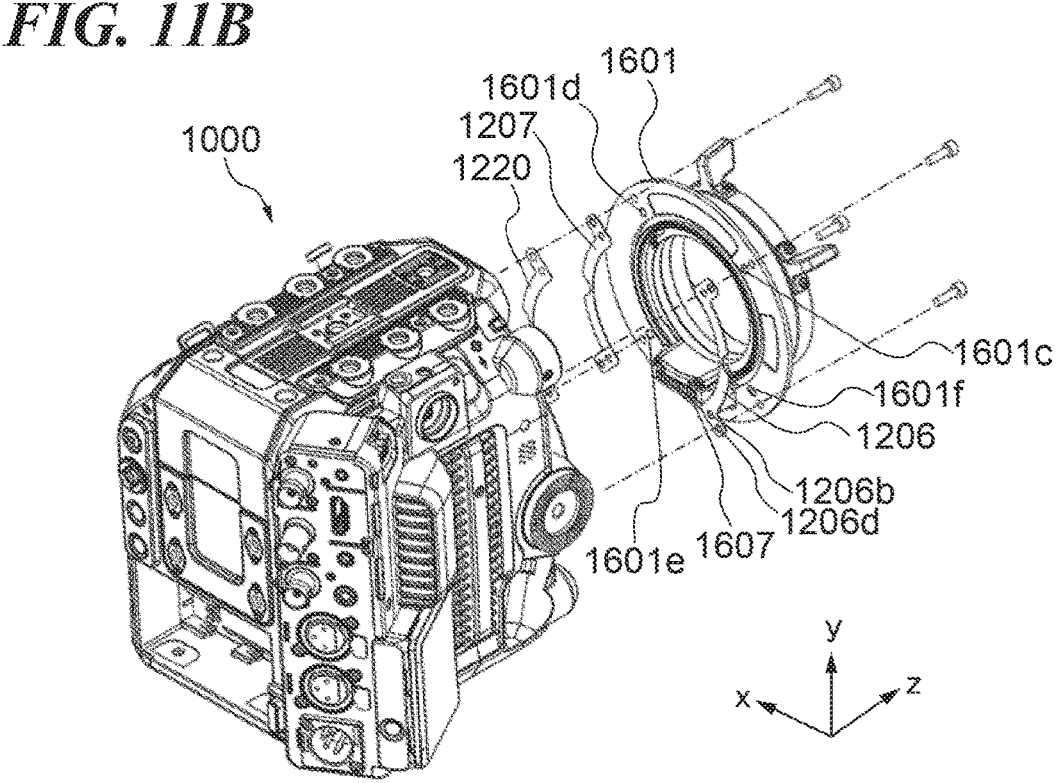

FIGS. 11A and 11B are perspective views illustrating how the second mount unit is attached to the image pickup apparatus in FIGS. 1A to 1C. FIG. 11A is a front perspective view illustrating how the second mount unit is attached to the image pickup apparatus, and FIG. 11B is a rear perspective view illustrating how the second mount unit is attached to the image pickup apparatus.

Referring to FIGS. 11A and 11B, the second mount unit 1600 is fixed to the image pickup apparatus main body 1000 by fastening the four screws 1301 to four fixing portions 1601p to 1601s of the second mount base 1601. In other words, by removing the four screws 1301, the second mount unit 1600 can be detached from the image pickup apparatus main body 1000.

The second mount unit 1600 is fixed to the image pickup device holding member 1204 on the image pickup apparatus main body 1000 side. The four positioning pins 1204a to 1204d of the image pickup device holding member 1204 are fitted into four positioning holes 1601c to 1601f of the second mount base 1601 in this order. As a result, the second mount unit 1600 is positioned with respect to the image pickup device holding member 1204.

An outside shape of the second mount unit 1600 (an outside shape of the second mount base 1601) is the same as the outside shape of the first mount unit 1100 (the outside shape of the first mount base 1101). The second mount unit 1600 is housed inside the guide rib 1211c, and the portion in which the second mount unit 1600 is housed is the ring-shaped concave portion formed on the front casing cover 1211 of the image pickup apparatus main body 1000. The positioning holes 1101a to 1101d of the first mount base 1101 and the positioning holes 1601c to 1601f of the second mount base 1601 are formed at the same locations. Also, the fixing portions 1101p to 1101s of the first mount base 1101 and the fixing portions 1601p to 1601s of the second mount base 1601 are formed at the same locations. Thus, the first mount unit 1100 and the second mount unit 1600 can be attached to and detached from the image pickup apparatus main body 1000 in the same manner.

The second mount unit 1600 and the image pickup device holding member 1204 sandwich and hold, for example, the first adjustment shim 1206, the second adjustment shim 1207, and a third adjustment shim 1220. As with the first mount unit 1100, the first adjustment shim 1206, the second adjustment shim 1207, and the third adjustment shim 1220 are disposed so as to be overlapped with an outside shape of the second mount unit 1600, on a projection surface in a case of viewing the image pickup apparatus main body 1000 from the front side in a direction of an optical axis. It should be noted that "being overlapped with an outside shape of the second mount unit 1600, on a projection surface in a case of viewing the image pickup apparatus main body 1000 from the front side in a direction of an optical axis" is a broad concept including being substantially overlapped with the outside shape of the second mount unit 1600 on a projection surface in a case of viewing the image pickup apparatus main body 1000 from the front side in a direction of an optical axis. Namely, by removing the second mount unit 1600, the first adjustment shim 1206, the second adjustment shim 1207, and the third adjustment shim 1220 can be detached from the image pickup apparatus main body 1000.

A description will now be given of a method for adjusting the flange back.

The adjustment shims such as the first adjustment shim 1206 and the second adjustment shim 1207 are configured to be easily interchangeable from outside the image pickup apparatus main body 1000 by a user detaching the mount unit (1100 or 1600) from the image pickup apparatus main body 1000 so as to adjust the flange back. The flange back is adjusted by interchanging the adjustment shims sandwiched and held between the bearing faces 1204e to 1204h of the image pickup device holding member 1204, and, for example, the bearing faces 1101e to 1101h (see FIGS. 4B, 6B) of the first mount base 1101. Namely, by interchanging the adjustment shims as appropriate, for example, the thicknesses of the thickness adjustment portions of the first adjustment shim 1206, the second adjustment shim 1207, and the third adjustment shim 1220 are changed. Thus, a user can easily adjust the flange back of the image pickup apparatus main body 1000 by using adjustment shims having thickness adjustment portions with desired thicknesses. Accordingly, it is preferred that multiple types of adjustment shims with different thicknesses are prepared so that a user can adjust the flange back of the image pickup apparatus main body 1000 as the need arises.

A description will now be given of a concrete example of the method for adjusting the flange back.

A description will now be given of the concrete example of the method for adjusting the flange back when detaching the first mount unit 1100 from the image pickup apparatus main body 1000 and interchanging it with the second mount unit 1600.

First, as illustrated in FIGS. 6A and 6B, the four screws 1301 are removed from the image pickup apparatus main body 1000 to remove the first mount unit 1100. Next, as illustrated in FIGS. 11A and 11B, the second mount unit 1600 is attached to the image pickup apparatus main body 1000, and the four screws 1301 are tightened. Thus, the mount units can be easily interchanged by simply removing the four screws 1301.

At this time, there is a possibility that the flange back will change due to variations in the dimensions of the first mount unit 1100 and the second mount unit 1600. In this case, the change in the flange back is corrected based on, for example, a level of blur in an image of a subject, which is a chart or the like, taken by the image pickup apparatus. For example, as shown in FIG. 11A, the flange back is adjusted by putting one first adjustment shim 1206 with a thickness of 0.3 mm on the left side and one second adjustment shim 1207 with a thickness of 0.3 mm and one third adjustment shim 1220 with a thickness of 0.1 mm on the right side between the second mount unit 1600 and the image pickup device holding member 1204. By adjusting the number and thicknesses of adjustment shims to be put on the right side and the left side, the flange back can be easily adjusted and corrected even in a case where an image is tilted in a horizontal direction.

A description will now be given of how the flange back is finely adjusted.

Figure 12:
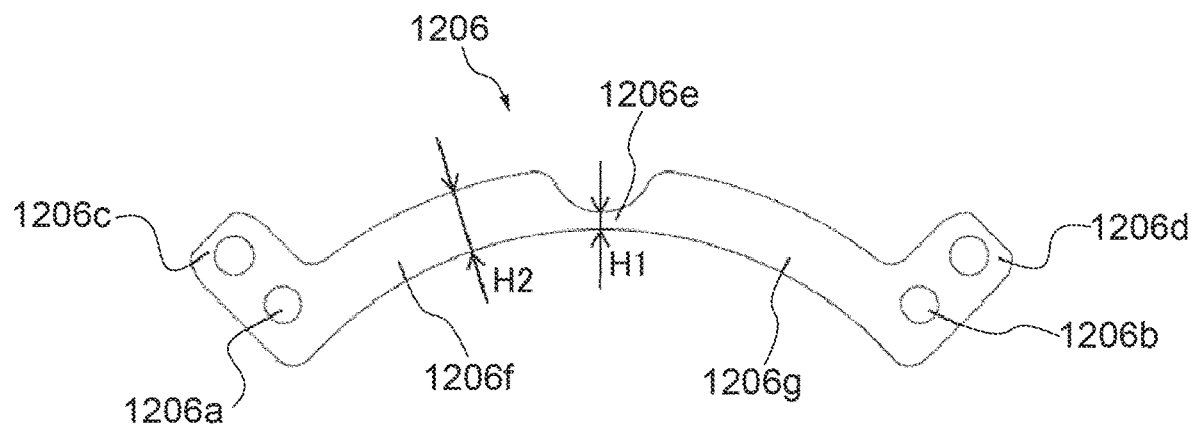
FIG. 12 is a front view of an adjustment shim to be attached to the image pickup apparatus in FIGS. 1A to 1C.

FIG. 12 is a front view of the adjustment shim to be attached to the image pickup apparatus in FIGS. 1A to 1C. As described above, for example, the first adjustment shim 1206 has the thickness adjustment portions 1206c and 1206d at the respective ends and has the positioning holes 1206a and 1206b close to and inside (inside in the direction of the optical axis) the thickness adjustment portions 1206c and 1206d. The first adjustment shim 1206 further has the pulling portion 1206e as the cut portion formed in the central part and has base portions 1206f and 1206g between the positioning hole 1206a and the pulling portion 1206e and between the positioning holes 1206b and the pulling portion 1206e. A width H1 of the pulling portion 1206c formed in the central part is extremely smaller than a width H2 of the base portions 1206f and 1206g which are areas other than the central part.

Therefore, the first adjustment shim 1206 can be divided by holding the base portions 1206f and 1206g and tearing the first adjustment shim 1206.

Figure 13:
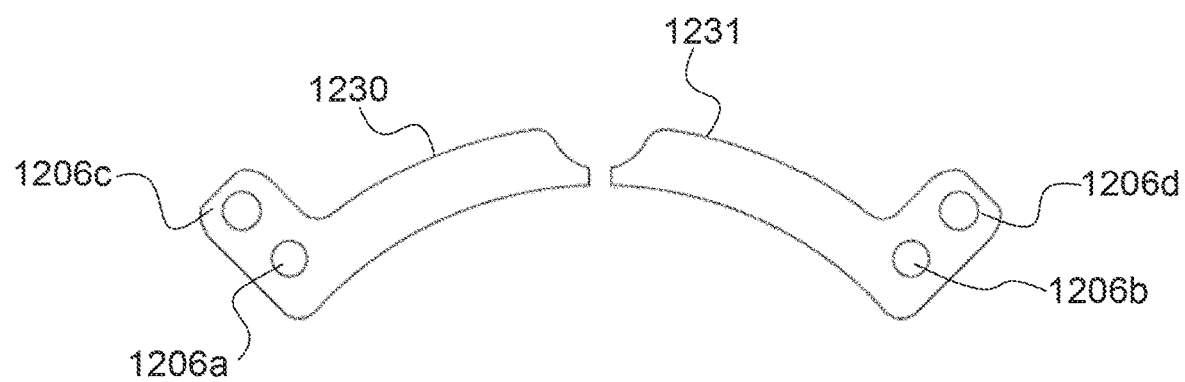
FIG. 13 is a view illustrating a state in which the adjustment shim is divided.

FIG. 13 is a view illustrating the state in which the adjustment shim has been divided. FIG. 13 illustrates two separate adjustment shims consisting of a separate adjustment shim 1230 (separate adjustment member) and a separate adjustment shim 1231 (separate adjustment member), which are obtained by dividing the adjustment shim 1206 into two at the pulling portion 1206e. The positioning holes 1206a and 1206b and the thickness adjustment portions 1206c and 1206d, which are important parts of the first separate adjustment shim 1206, are handled without being directly touched by fingers when the adjustment shim 1206 is cut. This avoids occurrence of problems such as adhesion of dirt to the thickness adjustment portions 1206c and 1206d and breaking of the first adjustment shim 1206 which would affect the flange back adjustment.

Since the first adjustment shim 1206 is divided at the pulling portion 1206e formed in substantially the center of the first adjustment shim 1206, the separate adjustment shims 1230 and 1231 have substantially the same shape. The separate adjustment shims 1230 and 1231 are each positioned at one point by fitting the positioning hole 1206a or 1206b on one of the positioning pins 1204a to 1204d of the image pickup device holding member 1204. The thickness adjustment portions 1206c or 1206d of the separate adjustment shim 1230 or 1231 can be placed on any of the bearing faces 1204e to 1204h of the image pickup device holding member 1204.

A description will now be given of a method of tilt adjustment for the flange back.

Figure 14A:
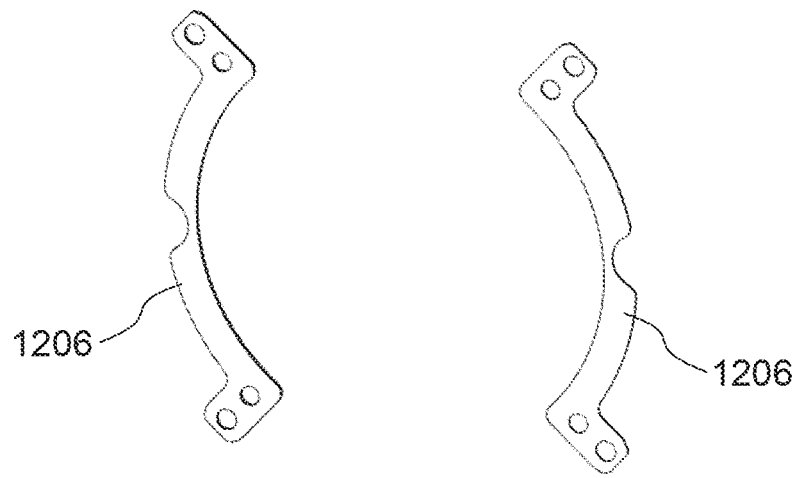
FIGS. 14A, 14B, and 14C are perspective views illustrating first adjustment shims set into an image pickup apparatus main body.
Figure 14B:
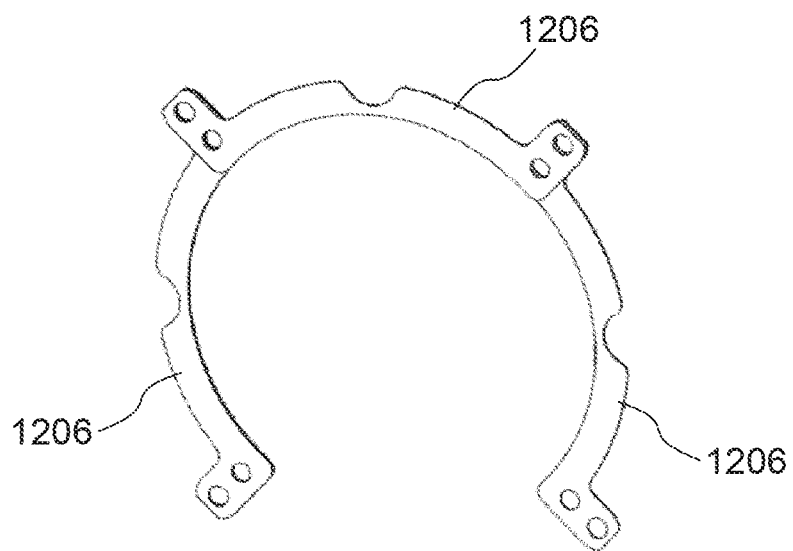
Figure 14C:
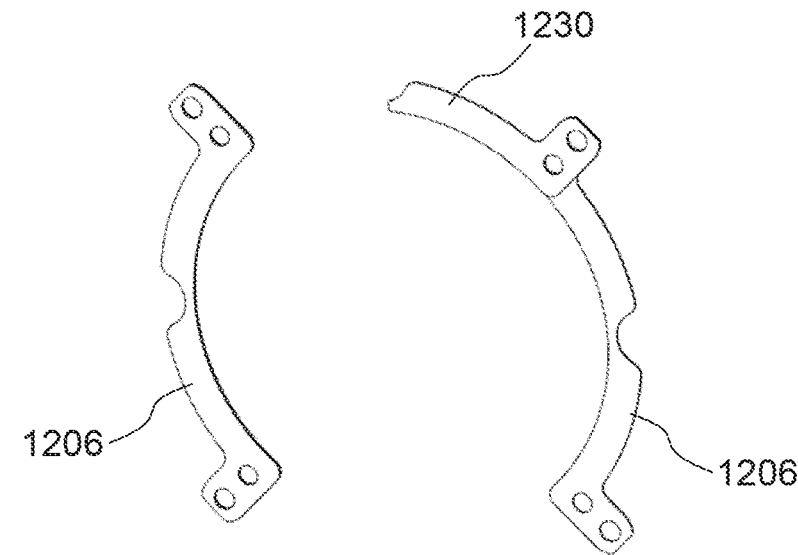

FIGS. 14A to 14C are perspective views illustrating the first adjustment shims 1206 set in the image pickup apparatus main body. In FIGS. 14A to 14C, the number of adjustment shims 1206 set in the image pickup apparatus main body varies. In the following description, it is assumed that the first adjustment shim 1206 has a thickness of 0.1 mm for the sake of convenience.

Referring to FIG. 14A, two first adjustment shims 1206 on the left side and one first adjustment shim 1206 on the right side are set in the image pickup apparatus main body. Referring to FIG. 14B, two first adjustment shims 1206 on the left side, one first adjustment shim 1206 on the right side, and one first adjustment shim 1206 on the upper side are set in the image pickup apparatus main body. Referring to FIG. 14C, two first adjustment shims 1206 on the left side, one first adjustment shim 1206 on the right side, and one separate adjustment shim 1230, which is obtained by dividing the first adjustment shim 1206, are set in the image pickup apparatus main body.

FIG. 15 is a table of total thicknesses of the thickness adjustment portions on bearing faces for various combinations of the adjustment shims in FIGS. 14A to 14C. With the thickness adjustment portions 1206c and 1206d, the first adjustment shim 1206 adjusts the heights of two neighboring ones of the bearing faces 1204e to 1204h of the image pickup device holding member 1204 at the same time. On the other hand, with the thickness adjustment portion 1206c or 1206d, the separate adjustment shim 1230 adjusts the height of one of the bearing faces 1204e to 1204h of the image pickup device holding member 1204.

As is apparent from FIGS. 14B and 15, by placing two first adjustment shims 1206, one first adjustment shim 1206, and one first adjustment shim 1206 on the left side, upper side, and right side, respectively, the total thicknesses of the thickness adjustment portions 1206c and 1206d of the first adjustment shims 1206 on each bearing face of the image pickup device holding member 1204 can be adjusted to different thicknesses. In this case, the total thicknesses of the thickness adjustment portions 1206c and 1206d on the bearing faces on the upper left, upper right, lower right, and lower left are 0.3 mm, 0.2 mm, 0.1 mm, and 0.2 mm, respectively. In this state, to decrease only the total thickness on the upper left bearing face where the thickness is the greatest, the separate adjustment shim 1230 obtained by dividing the first adjustment shim 1206 on the upper side is placed on only the upper right bearing face. As a result, the total thickness on one bearing face on the upper left can be adjusted, and the total thicknesses of the thickness adjustment portions 1206c and 1206d on the bearing faces on the upper left, upper right, lower right, and lower left are 0.2 mm, 0.2 mm, 0.1 mm, and 0.2 mm, respectively. Thus, the tilt adjustment for the flange back can be conducted as appropriate.

Although in the above description, the thickness of the thickness adjustment portions 1206c and 1206d of the first adjustment shim 1206 is only one thickness i.e. 0.1 mm, but actually, the thickness adjustment portions 1206c and 1206d with different thicknesses may be used, which makes it possible to more finely adjust the flange back.

According to the first embodiment, the first mount unit 1100 including the first terminal unit 1300 which is connected to the interchangeable lens 1400 is fixed to the image pickup device holding member 1204 located inside the ring-shaped guide rib 1211c of the front casing cover 1211 by the plurality of fixing portions (the plurality of fixing portions of the image pickup apparatus main body 1000). Also, the adjustment shims 1206 and others for adjusting the flange back are removably held between the mount unit 1100 and the image pickup device holding member 1204 (the fixing portions of the image pickup apparatus main body 1000). In a state in which the first mount unit 1100 is attached to the image pickup apparatus main body 1000 with at least one adjustment shim 1206, on a projection surface in a case of viewing the image pickup apparatus main body 1000 from the front side in the direction of the optical axis, the plurality of fixing portions, the at least one adjustment shim 1206, the first terminal unit 1103 of the first mount unit 1100, and the main body side terminal unit 1215 of the image pickup apparatus main body 1000 are overlapped with an outside shape of the first mount unit 1100. This enables a user to easily interchange the mount units on his or her own, and at the same time, easily adjust the flange back.

According to the first embodiment, the adjustment shims which are not circular or ring members but arc-shaped members are set on the rear side of the mount unit, and hence a user can flexibly correct for a change in the flange back. It should be noted that the arc shape means has only to look like an arc shape and is a concept including a substantial arc shape.

Moreover, the positioning portions (the positioning pins 1204a to 1204d) for the adjustment shim are disposed at four locations in the circumferential direction of the image pickup device holding member or the mount unit and vertically and horizontally symmetric, and the adjustment shim is fitted on two neighboring ones of the positioning portions. This also enables a user to flexibly adjust the flange back. In the first embodiment, the number of positioning pins 1204a to 1204d of the image pickup device holding member 1204 is not limited to four but may be three or four or more.

Furthermore, according to the first embodiment, since the pulling portion with an extremely small width is provided in the center of the adjustment shim, the separate adjustment shims can be easily formed by cutting the adjustment shim at the pulling portion. The flange back can be finely adjusted by engaging the separate adjustment shim with the positioning pin corresponding to an area where the flange back is desired to be adjusted among the positioning pins 1204a to 1204d of the image pickup device holding member 1204.

Additionally, according to the first embodiment, the arrangement described above enables a user to adjust the flange back according to interchangeable lenses he or she uses and interchange and use a variety of units with different electric terminals as appropriate.

Second Embodiment

A description will now be given of a second embodiment of the present invention.

In the arrangement of the first embodiment, the adjustment shims are held by the image pickup device holding member of the image pickup apparatus main body, while in an arrangement of the second embodiment, the adjustment shims are held by the mount unit. Namely, in the arrangement of the second embodiment described below, the relationship between the positioning pins and the positioning holes in the image pickup device holding member and the mount unit is reversed, and features of the construction that are the same as those in the first embodiment will not be described.

Figure 16A:
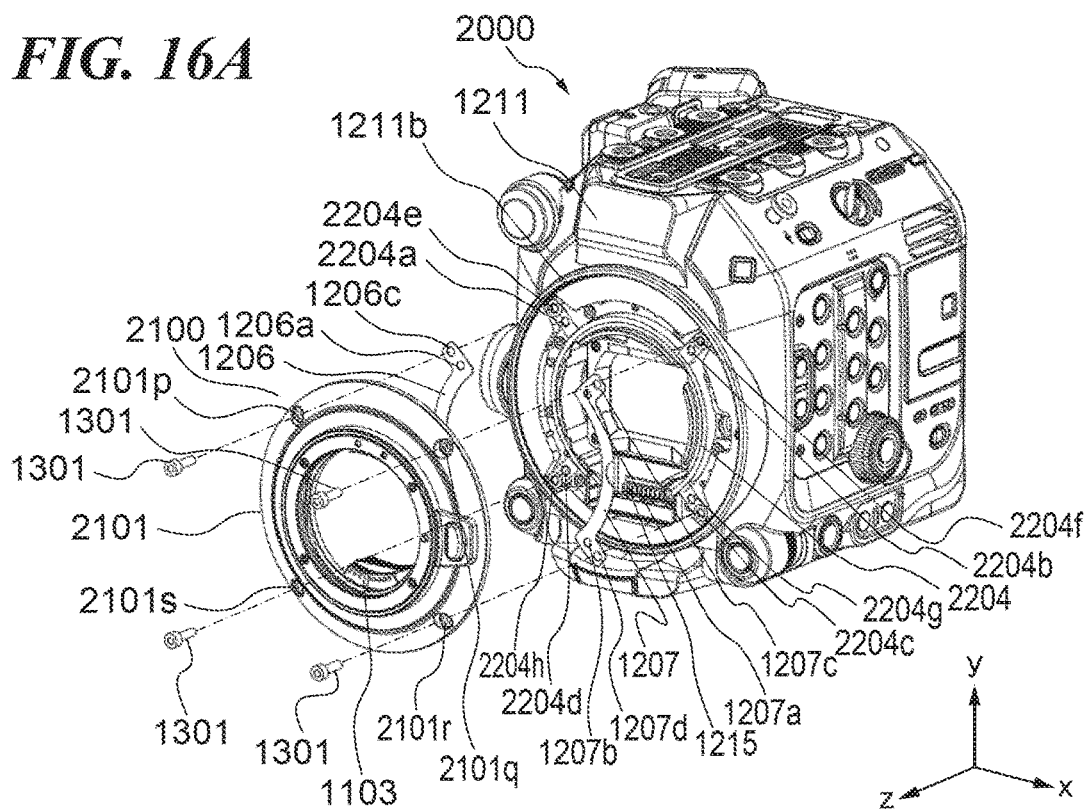
FIGS. 16A and 16B are views illustrating a state in which a mount unit has been detached from an image pickup apparatus main body according to a second embodiment.
Figure 16B:
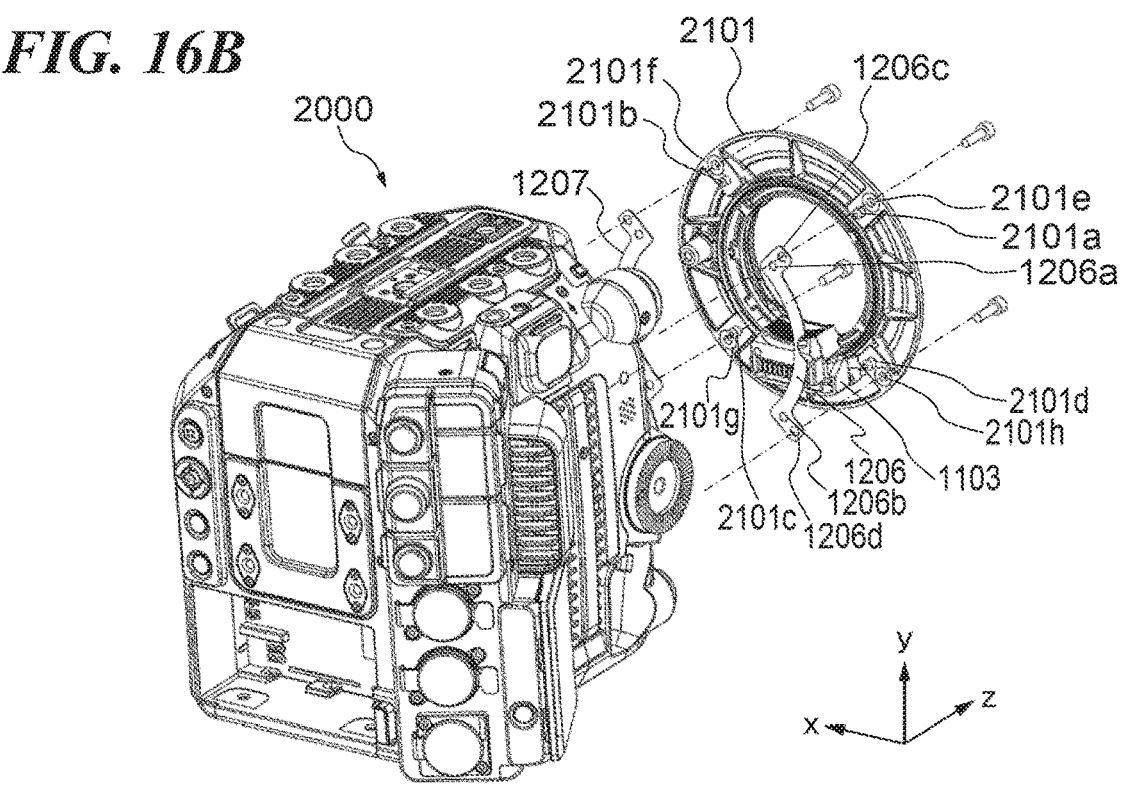

FIGS. 16A and 16B are views illustrating a state in which a mount unit has been detached from an image pickup apparatus main body according to the second embodiment. FIG. 16A is a front perspective view of the state in which the mount unit has been removed, and FIG. 16B is a rear perspective view of the state in which the mount unit has been removed.

FIGS. 16A and 16B illustrate the image pickup apparatus main body 2000 and the third mount unit 2100 (hereafter referred to merely as "the mount unit 2100"). The mount unit 2100 is fixed to the image pickup apparatus main body 2000 by fastening the four screws 1301 to four fixing portions 2101p to 2010s of a mount base 2101. Namely, by removing the four screws 1301, the mount unit 2100 can be detached from the image pickup apparatus main body 2000.

The mount unit 2100 is fixed to a second image pickup device holding member 2204 (hereafter referred to merely as "the image pickup device holding member 2204"). Four positioning pins 2101a to 2101d of the mount base 2101 are fitted into four positioning holes 2204a to 2204d of the image pickup device holding member 2204. As a result, a position at which the mount unit 2100 is fixed on the image pickup device holding member 2204 is defined.

The first adjustment shim 1206 and the second adjustment shim 1207 are sandwiched and held between the mount unit 2100 and the image pickup device holding member 2204. On a projection surface in a case of viewing the image pickup apparatus main body 2000 from the front side in the direction of the optical axis, the first adjustment shim 1206 and the second adjustment shim 1207 are disposed so as to be overlapped with an outside shape of the mount unit 2100. Namely, by detaching the mount unit 2100 from the image pickup apparatus main body 2000, the first adjustment shim 1206 and the second adjustment shim 1207 can be removed.

The first adjustment shim 1206 and the second adjustment shim 1207 have two positioning holes 1206a and 1206b and two positioning holes 1207a and 1207b, respectively. The first adjustment shim 1206 and the second adjustment shim 1207 are each positioned at two points by fitting into two neighboring ones of the four positioning pins 2101a to 2101d of the mount base 2101. Namely, positioning of the first and second adjustment shims 1206 and 1207 and the image pickup device holding member 2204 with respect to the mount unit 2100 is implemented by the four positioning pins 2101a to 2101d provided in the mount base 2101.

The four positioning pins 2101a to 2101d of the mount base 2101 are vertically and horizontally symmetric with respect to the optical axis of the image pickup apparatus main body 2000. The first adjustment shim 1206 and the second adjustment shim 1207 have the same shape, and they are symmetric with respect to a line. Thus, the first adjustment shim 1206 and the second adjustment shim 1207 are disposed, for example, symmetrically front and back at four locations on the upper, lower, right and left sides with respect to the mount unit 2100.

It should be noted that in the second embodiment, the first adjustment shim 1206 or the second adjustment shim 1207 is disposed at such locations (upper, right, and left locations) as not to interfere with the first terminal unit 1103 of the mount unit 2100. Referring to FIG. 16A, the first adjustment shim 1206 is disposed on the left side, and the second adjustment shim 1207 is disposed on the right side. The positioning holes 1206a and 1206b of the first adjustment shim 1206 are fitted on the positioning pins 2101a and 2101d, respectively, of the mount base 2101. The positioning holes 1207a and 1207b of the second adjustment shim 1207 are fitted on the positioning pins 2101b and 2101c, respectively, of the mount base 2101.

Bearing faces 2101e to 2101h of the mount base 2101 are disposed in this order close to and outside the respective positioning pins 2101a to 2101d. Namely, when the first adjustment shim 1206 and the second adjustment shim 1207 are held by the mount base 2101, the thickness adjustment portion 1206c overlaps the bearing face 2101e, and the thickness adjustment portion 1207d overlaps the bearing face 2101f. Also, the thickness adjustment portion 1207d of the second adjustment shim 1207 overlaps the bearing face 2101g, and the thickness adjustment portion 1206d of the first adjustment shim 1206 overlaps the bearing face 2101h.

A description will now be given of how the adjustment shims are attached to the mount unit.

Figure 17:
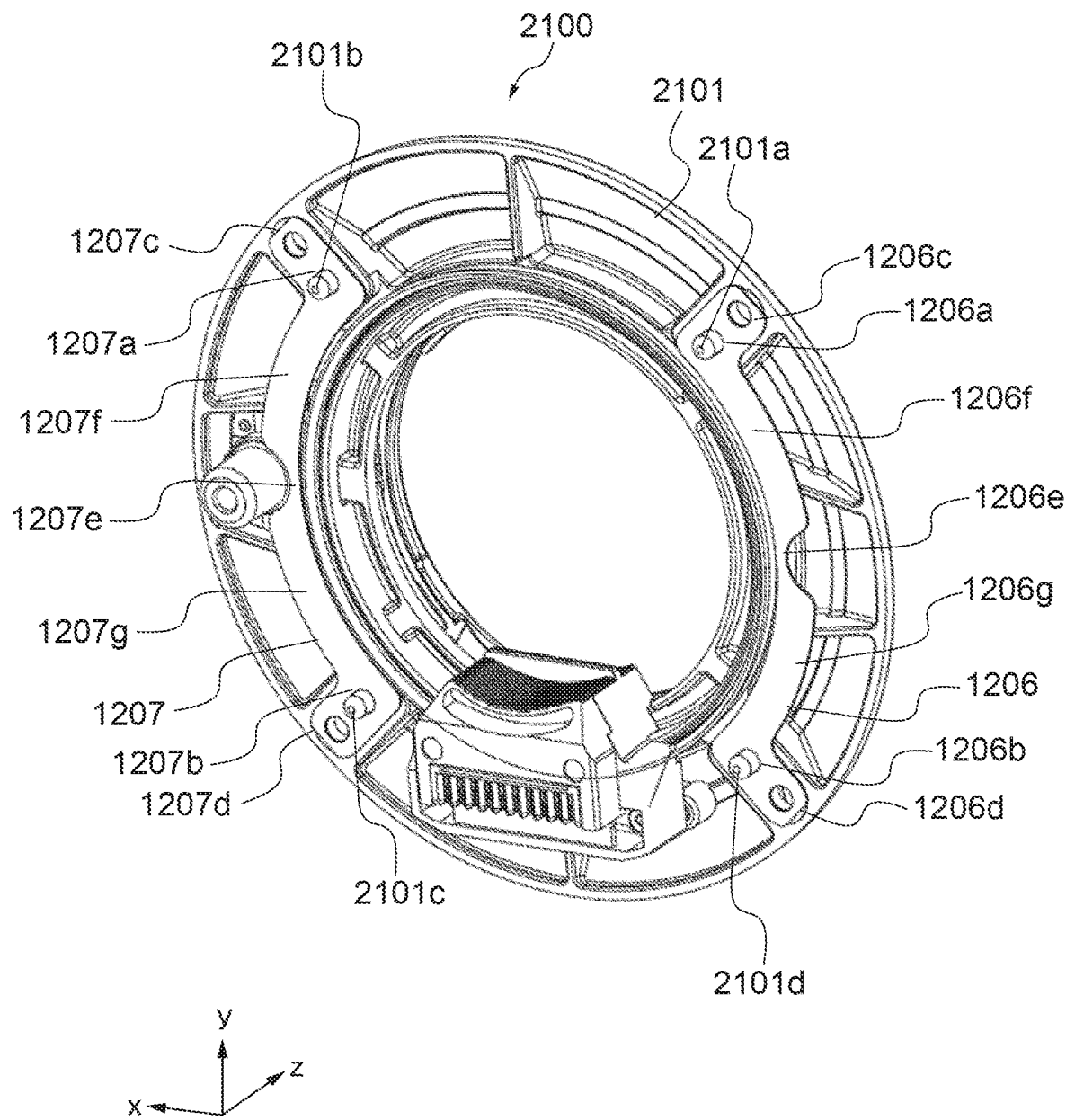
FIG. 17 is a rear perspective view illustrating a state in which adjustment shims are attached to the mount unit detached from the image pickup apparatus main body.

FIG. 17 is a rear perspective view illustrating a state in which the adjustment shims are attached to the mount unit that has been detached from the image pickup apparatus main body.

Referring to FIG. 17, one first adjustment shim 1206 and one second adjustment shim 1207 are set on a left side and a right side, respectively, of the mount unit 2100 that has been detached from the image pickup apparatus main body 2000. Namely, the first adjustment shim 1206 and the second adjustment shim 1207 are held on the mount unit 2100 side in the state of being fitted on the positioning pins 2101a to 2101d of the mount base 2101.

Between an area of the first adjustment shim 1206 other than its thickness adjustment portions 2106c and 2106d and the mount base 2101, there is space on a rear side of the mount base 2101 in the state in which the first adjustment shim 1206 is attached to the mount unit 2100. Also, between an area of the second adjustment shim 1207 other than its thickness adjustment portions 1207c and 1207d and the mount base 2101, there is a space on a rear side of the mount base 2101 in the state in which the second adjustment shim 1207 is attached to the mount unit 2100.

With this arrangement, a space is formed between the first adjustment shims 1206 and 1207 and the mount base 2101. As a result, the first adjustment shims 1206 and the second adjustment shim 1207 can be easily detached from the mount unit 2100.

It should be noted that in the second embodiment, a method for adjusting the flange back is the same as the one used in the first embodiment. Thus, description of the method for adjusting the flange back is omitted.

According to the second embodiment, the mount unit 2100 including the first terminal unit 1103 which is connected to the interchangeable lens 1400 is fixed to the image pickup device holding member 2204 located inside the ring-shaped guide rib 1211c of the front casing cover 1211 by the plurality of fixing portions (the plurality of fixing portions of the mount unit 2100). Also, the first adjustment shim 1206 and other shims for adjusting the flange back are removably held between the mount unit 2100 (the fixing portions of the mount unit 2100) and the image pickup device holding member 2204. In a state in which the mount unit 2100 is attached to the image pickup apparatus main body 2000 with at least one adjustment shim, on a projection surface in a case of viewing the image pickup apparatus main body 2000 from the front side in the direction of the optical axis, the plurality of fixing portions, the at least one adjustment shim, the first terminal unit 1103 of the mount unit 2100, and the main body side terminal unit 1215 of the image pickup apparatus main body 2000 are overlapped with an outside shape of the mount unit 2100. According to the second embodiment, at least one adjustment shim is held between the mount unit and the image pickup apparatus main body by the fixing portions of the mount unit, and as with the arrangement of the first embodiment described above in which at least one adjustment shim is held between the mount unit and the image pickup apparatus main body by the fixing portion of the image pickup apparatus main body, the mount unit can be easily attached to and detached from the image pickup apparatus main body so as to be interchanged. Moreover, the flange back of the image pickup apparatus can be easily adjusted and also finely adjusted.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-150317 filed on Aug. 20, 2019 which is hereby incorporated by reference herein in its entirety.

What is claimed is:

1. A main body of an image pickup apparatus to and from which a mount apparatus is capable of being attached and detached, comprising:
   a casing cover disposed on a front side of the main body to which the mount apparatus is attachable;
   a connector configured to be electrically connected to the mount apparatus; and
   fixing portions configured to fix the mount apparatus to the main body and hold removably at least one flange back adjustment member between the mount apparatus and the fixing portions,
   wherein the fixing portions include a first fixing portion, a second fixing portion, and a third fixing portion that are different from one another and configured to hold a flange back adjustment member with the first fixing portion and the second fixing portion while holding another flange back adjustment member with the second fixing portion and the third fixing portion, and
   in a state in which the mount apparatus is attached to the main body with at least one flange back adjustment member held between the mount apparatus and the fixing portions, on a projection surface in a case of viewing the main body from the front side in a direction of an optical axis, the first to third fixing portions, the at least one flange back adjustment member, and the connector are overlapped with an outside shape of the mount apparatus.

2. The main body of the image pickup apparatus according to claim 1, wherein the casing cover includes
   a guide rib that guides the mount apparatus that is being attached to the main body,
   a concave portion formed more inside than the guide rib in the direction close to the optical axis, and
   a groove portion that has a concave shape in cross section, formed on an outer periphery of the concave portion, and
   wherein in a state in which the mount apparatus is attached to the main body, on a projection surface in a case of viewing the mount apparatus from the optical axis, an outer periphery of the mount apparatus overlaps the groove portion that has the concave shape in cross section.

3. The main body of the image pickup apparatus according to claim 2, wherein, on a projection surface in a case of viewing the casing cover from the optical axis, the concave portion of the casing cover is formed at a location not to overlap the at least one flange back adjustment member put between the mount apparatus and the fixing portions.

4. The main body of the image pickup apparatus according to claim 1, further comprising an image pickup device holding member to which the mount apparatus is fixed,
   wherein the mount apparatus is interchangeable with another according to an interchangeable lens to be attached to the mount apparatus, and the mount apparatuses capable of being fixed to the image pickup device holding member according to the interchangeable lenses include respective different electric terminals, and
   the image pickup device holding member includes a terminal for electrically connecting to each of the different electric terminals of the mount apparatuses.

5. The main body of the image pickup apparatus according to claim 1, further comprising an image pickup device holding member,
   wherein the image pickup device holding member includes a plurality of positioning portions that define a position at which the mount apparatus is fixed to the image pickup device holding member.

6. The main body of the image pickup apparatus according to claim 5, wherein the image pickup device holding member includes bearing faces that are disposed in proximity to the plurality of positioning portions, respectively, and each of the bearing faces holds a thickness adjustment portion of the flange back adjustment member put between the bearing face and a fixing portion of the mount apparatus.

7. The main body of the image pickup apparatus according to claim 6, wherein the image pickup device holding member and the mount apparatus hold a thickness adjustment portion of the flange back adjustment member put between the image pickup device holding member and the mount apparatus, with a space made between a part of the flange back adjustment member other than the thickness adjustment portion and the image pickup device holding member or the mount apparatus.

8. The main body of the image pickup apparatus according to claim 5, wherein the positioning portions are disposed at three or more locations in a circumferential direction of the image pickup device holding member such that the flange back adjustment member is engaged with two neighboring ones of the positioning portions.

9. The main body of the image pickup apparatus according to claim 8, wherein the positioning portions are disposed in the circumferential direction of the image pickup device holding member such that the flange back adjustment members are disposed at opposed two positions on an outer periphery of the image pickup device holding member or the mount apparatus.

10. The main body of the image pickup apparatus according to claim 1, further comprising an image pickup device holding member,
    wherein a position at which the mount apparatus is fixed to the image pickup device holding member is defined by a plurality of positioning portions of the mount apparatus.

11. The main body of the image pickup apparatus according to claim 10, wherein the image pickup device holding member includes bearing faces disposed in proximity to areas facing the plurality of positioning portions of the mount apparatus, respectively, and each of the bearing faces holds a thickness adjustment portion of the flange back adjustment member put between the bearing face and a fixing portion of the mount apparatus.

12. The main body of the image pickup apparatus according to claim 11, wherein the image pickup device holding member and the mount apparatus hold a thickness adjustment portion of the flange back adjustment member put between the image pickup device holding member and the mount apparatus, with a space made between a part of the flange back adjustment member other than the thickness adjustment portion and the image pickup device holding member or the mount apparatus.

13. The main body of the image pickup apparatus according to claim 10, wherein the positioning portions are disposed at three or more locations in a circumferential direction of the mount apparatus such that the flange back adjustment member is engaged with two neighboring ones of the positioning portions.

14. The main body of the image pickup apparatus according to claim 13, wherein the positioning portions are disposed in the circumferential direction of the mount apparatus such that the flange back adjustment members are disposed at opposed two positions on an outer periphery of the image pickup device holding member or the mount apparatus.

15. A mount apparatus capable of being attached to and detached from a main body of an image pickup apparatus, comprising:
   a connector configured to be electrically connected to the main body; and
   fixing portions configured to be fixed to the main body and hold removably at least one flange back adjustment member between the main body and the fixing portions,
   wherein the fixing portions include a first fixing portion, a second fixing portion, and a third fixing portion that are different from one another and configured to hold a flange back adjustment member with the first fixing portion and the second fixing portion while holding another flange back adjustment member with the second fixing portion and the third fixing portion, and
   in a state in which the mount apparatus is attached to the main body with at least one flange back adjustment member held between the main body and the fixing portions, on a projection surface in a case of viewing the main body from a front side thereof to which the mount apparatus is attachable in a direction of an optical axis, the first to third fixing portions, the at least one flange back adjustment member, and the connector are overlapped with an outside shape of the mount apparatus.

16. The mount apparatus according to claim 15, further comprising positioning portions disposed at three or more locations in a circumferential direction of the mount apparatus,
wherein the positioning portions define a position at which an image pickup device holding member of the main body and the at least one flange back adjustment member are fixed to the mount apparatus.

17. A flange back adjustment member for an image pickup apparatus including a main body, an image pickup device holding member that holds an image pickup device in the main body, and the mount apparatus for attaching an interchangeable lens to the main body, for being held between the mount apparatus and the image pickup device holding member, the flange back adjustment member comprising:
   an arc-shaped member made of a thin sheet, including
      thickness adjustment portions provided at both ends of the arc-shaped member,
      positioning portions provided in proximity to the thickness adjustment portions, respectively, and
      a cut portion that is formed in a central part of the arc-shaped member a width of which is smaller than a width of an area of the arc-shaped member other than the central part.

18. The flange back adjustment member according to claim 17, wherein the width of the cut portion is smaller than a width of an area of the arc-shaped member extending from the thickness adjustment portion to the cut portion.

19. The flange back adjustment member according to claim 17, wherein positioning portions in proximity to the thickness adjustment portions are engaged with neighboring positioning portions of the image pickup device holding member or the mount apparatus, to position at two points the flange back adjustment member between the mount apparatus and the image pickup device holding member, and a flange back is adjusted with the thickness adjustment portions.

20. The flange back adjustment member according to claim 17, wherein the flange back adjustment member is divided into two at the cut portion to form two separate adjustment members.

21. The flange back adjustment member according to claim 20, wherein the positioning portion of the separate adjustment member is engaged with a positioning portion of the image pickup device holding member or the mount apparatus, to position at one point the separate adjustment member between the mount apparatus and the image pickup device holding member, and a flange back is adjusted with the thickness adjustment portion.

22. The flange back adjustment member according to claim 21, wherein the positioning portion of the separate adjustment member is engaged with one of positioning portions disposed in a circumferential direction of the image pickup device holding member or the mount apparatus, the one corresponding to an area where the flange back is to be adjusted.

* * * * *